(12) United States Patent
Nishizuka et al.

(10) Patent No.: US 12,492,433 B2
(45) Date of Patent: Dec. 9, 2025

(54) PROBE/PRIMER LIBRARY FOR DIAGNOSIS OF CANCER

(71) Applicant: IWATE MEDICAL UNIVERSITY EDUCATIONAL FOUNDATION, Iwate (JP)

(72) Inventors: Satoshi Nishizuka, Shiwa-gun (JP); Takeshi Iwaya, Shiwa-gun (JP)

(73) Assignee: IWATE MEDICAL UNIVERSITY EDUCATIONAL FOUNDATION, Iwate (JP)

( * ) Notice: Subject to any disclaimer, the term of this patent is extended or adjusted under 35 U.S.C. 154(b) by 1011 days.

(21) Appl. No.: 17/264,094

(22) PCT Filed: Jul. 12, 2019

(86) PCT No.: PCT/JP2019/027782
§ 371 (c)(1),
(2) Date: Jan. 28, 2021

(87) PCT Pub. No.: WO2020/026776
PCT Pub. Date: Feb. 6, 2020

(65) Prior Publication Data
US 2022/0195527 A1    Jun. 23, 2022

(30) Foreign Application Priority Data
Jul. 31, 2018   (JP) .................... 2018-143912

(51) Int. Cl.
*C12Q 1/6886* (2018.01)
*C12Q 1/6827* (2018.01)

(52) U.S. Cl.
CPC ......... *C12Q 1/6886* (2013.01); *C12Q 1/6827* (2013.01); *C12Q 2600/118* (2013.01); *C12Q 2600/156* (2013.01)

(58) Field of Classification Search
CPC ............... C12Q 1/6886; C12Q 1/6827; C12Q 2600/118; C12Q 2600/156; C12Q 1/6876; C40B 40/06
See application file for complete search history.

(56) References Cited

U.S. PATENT DOCUMENTS

| | | | | |
|---|---|---|---|---|
| 2005/0244851 A1* | 11/2005 | Blume | ................... | C12Q 1/6876 435/287.2 |
| 2010/0286143 A1* | 11/2010 | Dias-Santagata | .... | C12Q 1/6886 514/266.4 |
| 2012/0171305 A1 | 7/2012 | Kandioler | | |
| 2012/0171687 A1 | 7/2012 | Kandioler | | |
| 2014/0288116 A1 | 9/2014 | Bandla et al. | | |
| 2016/0326600 A1* | 11/2016 | Zhang | ................... | C12Q 1/6886 |
| 2018/0051320 A1* | 2/2018 | DeRisi | ................... | C12Q 1/6848 |

FOREIGN PATENT DOCUMENTS

| | | |
|---|---|---|
| CN | 107663533 A | 2/2018 |
| JP | 2011-529691 A | 12/2011 |
| JP | 2012-135290 A | 7/2012 |
| JP | 2016-104010 A | 6/2016 |
| JP | 2016-198027 A | 12/2016 |
| WO | 2010/014920 A1 | 2/2010 |

OTHER PUBLICATIONS

Arcand (BMC Medical Genetics 16 (2015): 1-11) (Year: 2015).*
Li (Gene and Gene Editing 1.2 (2015): 145-148) (Year: 2015).*
Milbury (Biomolecular detection and quantification 1.1 (2014): 8-22) (Year: 2014).*
Wang (Human mutation 24.1 (2004): 21-34) (Year: 2004).*
Leroy (Human mutation 35.6 (2014): 756-765), Pilat (European Journal of Surgical Oncology (EJSO) 41.5 (2015): 683-689) (Year: 2015).*
Zerdoumi (Human molecular genetics 26.14 (2017): 2591-2602) (Year: 2017).*
Soussi (Human mutation 25.1 (2005): 6-17) (Year: 2005).*
Wegert (The Journal of Pathology: Clinical Research 3.4 (2017): 234-248) (Year: 2017).*
Manie (Cancer research 69.2 (2009): 663-671) (Year: 2009).*
Zanaruddin (PloS one 8.11 (2013): e80229) (Year: 2013).*
Yamanoshita (International journal of cancer 114.1 (2005): 74-79) (Year: 2005).*
Perez-Escuredo (Human pathology 43.11 (2012): 1894-1901) (Year: 2012).*
Kandioler (BioMedicine 2.8 (2015): 825-830) (Year: 2015).*
Kanagal-Shamanna (The Journal of Molecular Diagnostics 15.5 (2013): 1) (Year: 2013).*
Merten (American journal of clinical pathology 146.6 (2016): 718-726) (Year: 2016).*
Chiaretti (Genes, Chromosomes and Cancer 50.4 (2011): 263-274) (Year: 2011).*
Tung (Journal of Clinical Oncology 34.13 (2016): 1460) (Year: 2016).*
Lambrinakos (Human mutation 23.2 (2004): 186-192) (Year: 2004).*
Chang (Oncotarget 7.25 (2016): 37566) (Year: 2016).*
Yamaguchi (Lung cancer 78.3 (2012): 201-206) (Year: 2012).*
Laurent-Puig (Gastroenterology 120.7 (2001): 1763-1773) (Year: 2001).*
Deben (University of Antwerp, 2016) (Year: 2016).*

(Continued)

*Primary Examiner* — Anne M. Gussow
*Assistant Examiner* — Kyle T Rega
(74) *Attorney, Agent, or Firm* — WHDA, LLP

(57) ABSTRACT

An object is to provide a versatile means utilizing a probe for dPCR, which enables quick detection of a mutation relevant to a cancer. A library including a plurality of probes and/or primers or primer pairs for detecting a mutation relevant to a cancer in the DNA-binding domain of the TP53 gene is provided. By using the present invention, relapse of alimentary canal cancer after treatment can be diagnosed at an early stage. Individualized post-treatment follow-up of an alimentary canal cancer patient is also enabled.

7 Claims, 6 Drawing Sheets

Specification includes a Sequence Listing.

(56) References Cited

OTHER PUBLICATIONS

Kuo (Cancer genetics and cytogenetics 201.2 (2010): 94-101) (Year: 2010).*
Belickova (Oncotarget 7.24 (2016): 36266) (Year: 2016).*
Springer (Johns Hopkins University, 2017) (Year: 2017).*
Adduri (PloS one 9.12 (2014): e114002) (Year: 2014).*
Kalemi (Cancer letters 222.1 (2005): 57-65) (Year: 2005).*
Papathomas (Human Pathology 58 (2016): 113-122) (Year: 2016).*
Prevo (Cancer research 59.19 (1999): 4784-4787) (Year: 1999).*
Coren (Human mutation 30.11 (2009): 1583-1590) (Year: 2009).*
Eachkoti (Cancer Letters 248.2 (2007): 308-320) (Year: 2007).*
Cariello (Carcinogenesis 15.10 (1994): 2281-2285) (Year: 1994).*
Svobodova (Leukemia research 42 (2016): 7-12) (Year: 2016).*
Geurts-Giele (Virchows Archiv 462 (2013): 249-254) (Year: 2013).*
Smetana (Int J Clin Exp Pathol 9.1 (2016): 49-60) (Year: 2016).*
Nandikolla (Breast Cancer: Targets and Therapy (2017): 207-215) (Year: 2017).*
Stancheva (BioMed research international 2014 (2014)) (Year: 2014).*
Yurgelun (Gastroenterology 149.3 (2015): 604-613) (Year: 2015).*
Yuli Chang (World journal of gastroenterology 22.7 (2016): 2314) (Year: 2016).*
Thierry Soussi (Human mutation 35.6 (2014): 766-778) (Year: 2014).*
Schroeder (Combined Faculties for the Natural Sciences and for Mathematics of the Ruperto-Carola University of Heidelberg, 2017 (Year: 2017).*
Misyurina (Blood 128.22 (2016): 5402) (Year: 2016).*
Zhang (The Johns Hopkins University, 2010) (Year: 2010).*
Jin Li (Human mutation 30.11 (2009): 1583-1590) (Year: 2009).*
Minervini (Experimental and Molecular Pathology 103.1 (2017): 33-37) (Year: 2017).*
Cole (Scientific data 4.1 (2017): 1-8) (Year: 2017).*
Jesinghaus (Genes, Chromosomes and Cancer 55.6 (2016): 505-521) (Year: 2016).*
Park (Annals of laboratory medicine 36.5 (2016): 463), Cole (Scientific data 4.1 (2017): 1-8) (Year: 2017).*
Helbig (Oncotarget 8.65 (2017): 109457) (Year: 2017).*
Takashi (Annals of surgical oncology 25 (2017): 737-744) (Year: 2017).*
Naipal (Clinical Cancer Research 20.18 (2014): 4816-4826) (Year: 2014).*
Samuel (University of Toronto, 2016) (Year: 2016).*
Shimizu (Gastroenterology 147.2 (2014): 407-417) (Year: 2014).*
Jiao (Genes, Chromosomes and Cancer 51.5 (2012): 480-489) (Year: 2012).*
Al-Qasem (Oncology Letters 2.2 (2011): 363-369) (Year: 2011).*
Lionetta (Oncotarget 7.16 (2016): 21353) (Year: 2016).*
ClinVar412 (NCBI (2016) (Year: 2016).*
Cuadra (WHO (2016)) (Year: 2016).*
Burghel (BioMed Research International 2015 (2015)) (Year: 2015).*
Diamantopoulos (Anticancer Research 37.5 (2017): 2387-2391) (Year: 2017).*
Whitworth (JAMA oncology 2.3 (2016): 373-379), (Year: 2016).*
Kim (Cancer letters 330.1 (2013): 33-40) (Year: 2013).*
Auslands (Rigas University (2015)) (Year: 2015).*
Røtterud (Norwegian University of Life Sciences (2014)) (Year: 2014).*
ClinVar733 (NCBI (2016)) (Year: 2016).*
Lorenz (Oncotarget 7.5 (2016): 5273) (Year: 2016).*
Melhem-Bertrandt (Cancer 118.4 (2012): 908-913) (Year: 2012).*
Groves (British journal of cancer 109.9 (2013): 2434-2444) (Year: 2013).*
ClinVar808 (NCBI (2017) (Year: 2017).*
Tindall (Human mutation 30.6 (2009): 876-883) (Year: 2009).*
Harvey (Pathology 48.5 (2016): 454-462) (Year: 2016).*
Noguchi (Cancer medicine 4.12 (2015): 1809-1816) (Year: 2015).*
Sekine (Genes, Chromosomes and Cancer 53.4 (2014): 366-372) (Year: 2014).*
Lee (Journal of Korean medical science 25.5 (2010): 698) (Year: 2010).*
Singh (Mutation Research/Fundamental and Molecular Mechanisms of Mutagenesis 783 (2016): 15-26) (Year: 2016).*
ClinVar518 (NCBI (2016) (Year: 2016).*
ClinVar596 (NCBI (Jan. 8, 2018) (Year: 2018).*
Hwang (Journal of Thoracic Oncology 11.4 (2016): 496-503) (Year: 2016).*
Hermsen (European journal of endocrinology 169.1 (2013): 51-58) (Year: 2013).*
Courville (Modern Pathology 29.10 (2016): 1200-1211) (Year: 2016).*
Heitzer (Modern Pathology 30.12 (2017): 1698-1709) (Year: 2017).*
Villani (The Lancet Oncology 17.9 (2016): 1295-1305) (Year: 2016).*
Han (Genomics, Proteomics and Bioinformatics 15.2 (2017): 59-72) (Year: 2017).*
Extended (Supplementary) European Search Report dated Mar. 23, 2022, issued in counterpart EP Application No. 19843885.5. (10 pages).
Castellanos-Rizaldos, E. et al.; Enhanced Ratio of Signals Enables Digital Mutation Scanning for Rare Allele Detection, The Journal of Molecular Diagnostics, vol. 17, No. 3, May 1, 2015, pp. 284-292, SP055344353. cited in EESR dated Mar. 23, 2022 (9 pages).
Marchio, A. et al: Droplet digital PCR detects high rate of TP53 R249S mutants in cell-free DNA of middle African patients eith hepatocellular carcinoma, Clinical and Experimental Medicine, Springer Verlag Milan, IT, vol. 18, No. 3, May 10, 2018, pp. 421-431, XP036550251. cited in EESR dated Mar. 23, 2022 (11 pages).
Sato, Kei et al., "Individualized Mutation Detection in Circulating Tumor DNA for Monitoring Colorectal Tumor Burden Using a Cancer-Associated Gene Sequencing Panel" PLoS One, 2016, PMID, 26727500; Cited in the Specification. (15 pages).
Parkinson, Cristine et al., "Exploratory Analysis of TP53 Mutations in Circulating Tumour DNA as Biomarkers of Treatment Response for Patients with Relapsed High-Grade Serous Ovarian Carcinoma: A Retrospective Study", PLoS Med, 13(12), 2016, e1002198; Cited in the Specification and ISR. (25 pages).
Iwaya, Takeshi et al., "Study on esophageal cancer mutation gene identification efficiency using target sequences", 2017, SF-06-5, entire text, The 117th Annual Congress of Japan Surgical Society, non-official translation; Cited in ISR. (1 page).
Endo Fumitaka et al., "Study on usefulness of hematological tumor markers during course of treatment of esophageal squamous cell carcinoma", 2017, PS-177-8, entire text, The 117th Annual Congress of Japan Surgical Society, non-official translation; Cited in ISR. (1 page).
Zaanan, A. et al., "Prognostic value of circulating tumor DNA in advanced colorectal cancer patients: Quantification of hypermethylated or mutant sequences using picoliter droplet digital PC", Annals of Oncology, 2016, vol. 27, Suppl. 6, 530P, entire text; Cited in ISR. (1 page).
Iwaya, Takeshi et al., "Study on Circulating tumor DNA monitoring system for patients with esophageal cancer", The 118th Annual Congress of Japan Surgical Society Apr. 2018, SF-006-3, entire text, non-official translation; Cited in ISR. (1 page).
International Preliminary Report on Patentability (Form PCT/IB/373) issued in counterpart International Application No. PCT/JP2019/027782 dated Feb. 2, 2021, with Form PCT/ISA/237. (12 pages).
Office Action dated Feb. 1, 2024, issued in counterpart CN application No. 201980050731.8, with English translation. (13 pages).
Office Action dated Jul. 29, 2024, issued in counterpart EP Application No. 19843885.5 (9 pages).
Charles Decraene et al., "Multiple Hotspot Mutations Scanning by Single Droplet Digital PCR", Clinical Chemistry, American Association for Clinical Chemistry, vol. 64, No. 2, 2018, pp. 317-328; cited in EP Office Action dated Jul. 29, 2024. (12 pages).
Office Action dated Jan. 11, 2025, issued in counterpart CN Application No. 201980050731.8, with English translation. (17 pages).
Office Action dated Jan. 22, 2025, issued in counterpart KR Application No. 10-2021-7005466, with English translation. (13 pages).

(56) References Cited

OTHER PUBLICATIONS

QBiomarker Somatic Mutation PCR Array Human TP53 Gene, Cat. No. 337021 SMH-812AA, Qiagen, Mar. 2011. (6 pages); cited in KR Office Action dated Jan. 22, 2025.
Office Action dated Feb. 3, 2025, issued in counterpart AU Application No. 2019315114. (5 pages).
English machine translation of Office Action dated May 29, 2025, issued in counterpart CN Application No. 201980050731.8. (8 pages).

\* cited by examiner

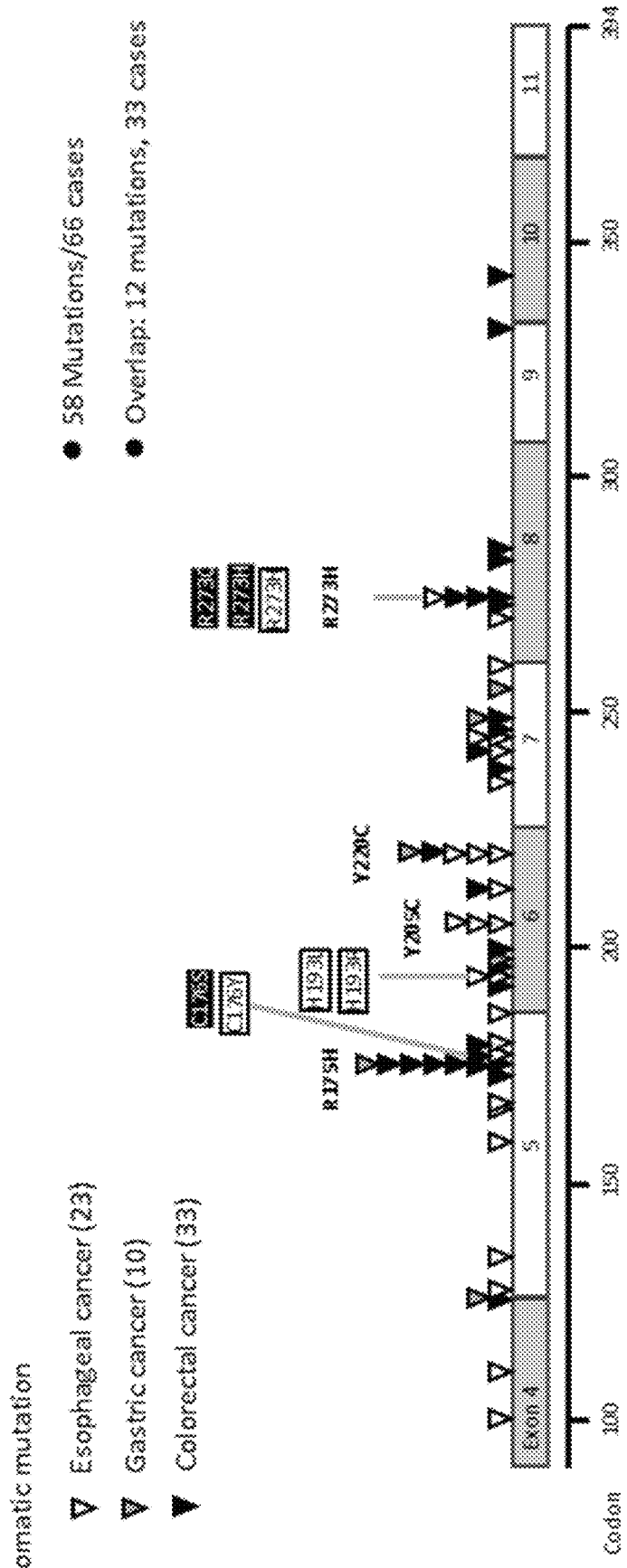
[Fig.1]

[Fig.2]

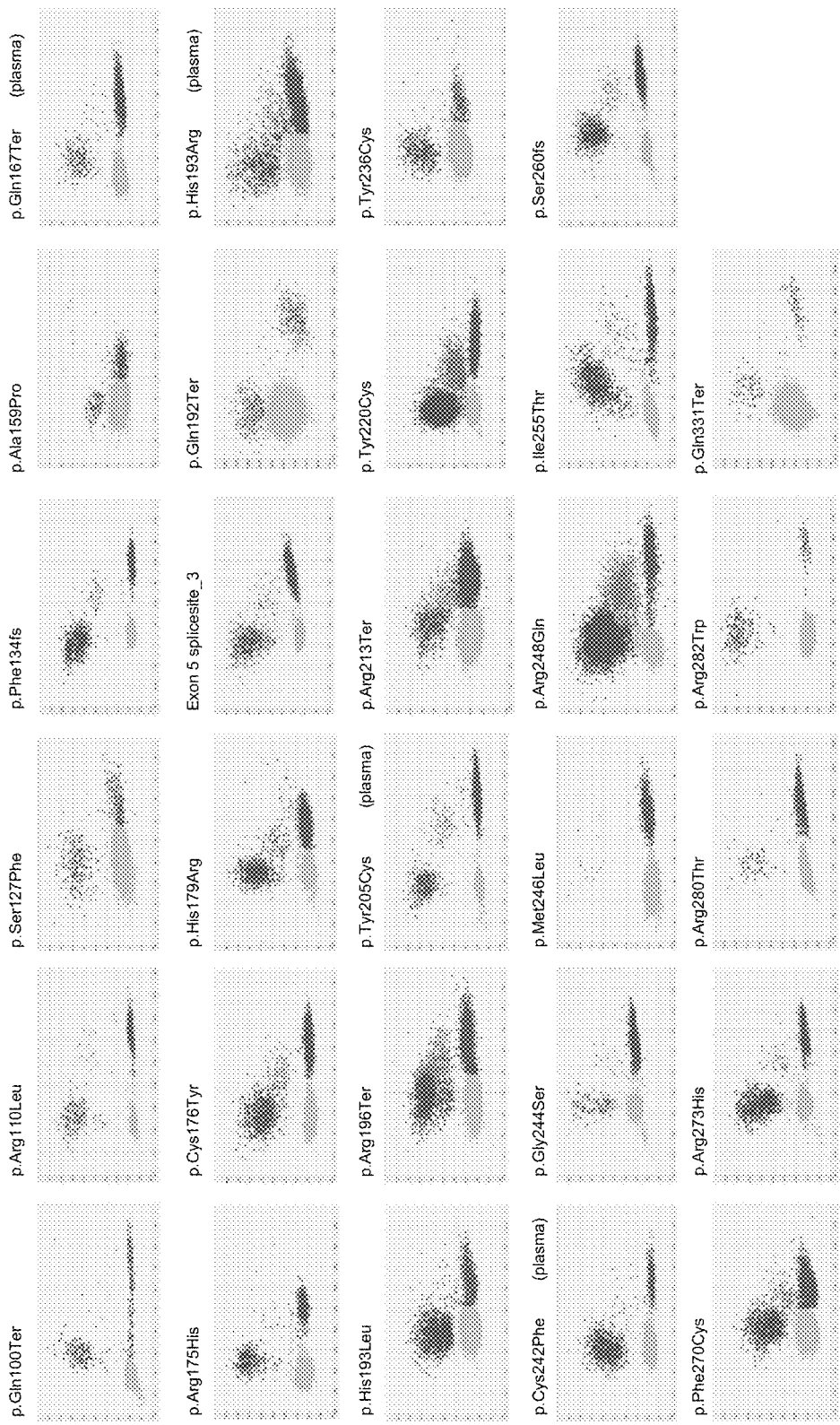
[Fig.3]

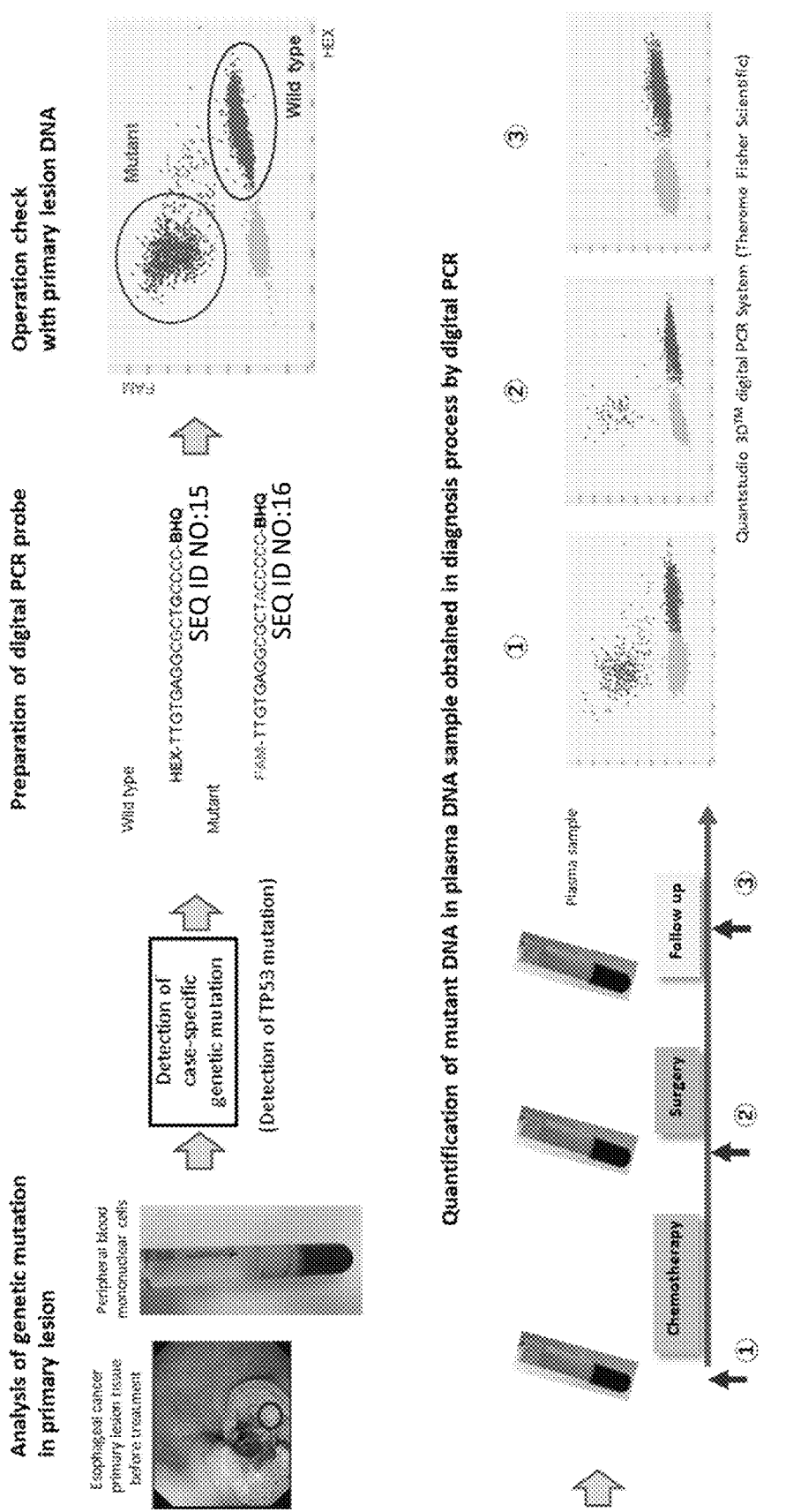
[Fig.4]

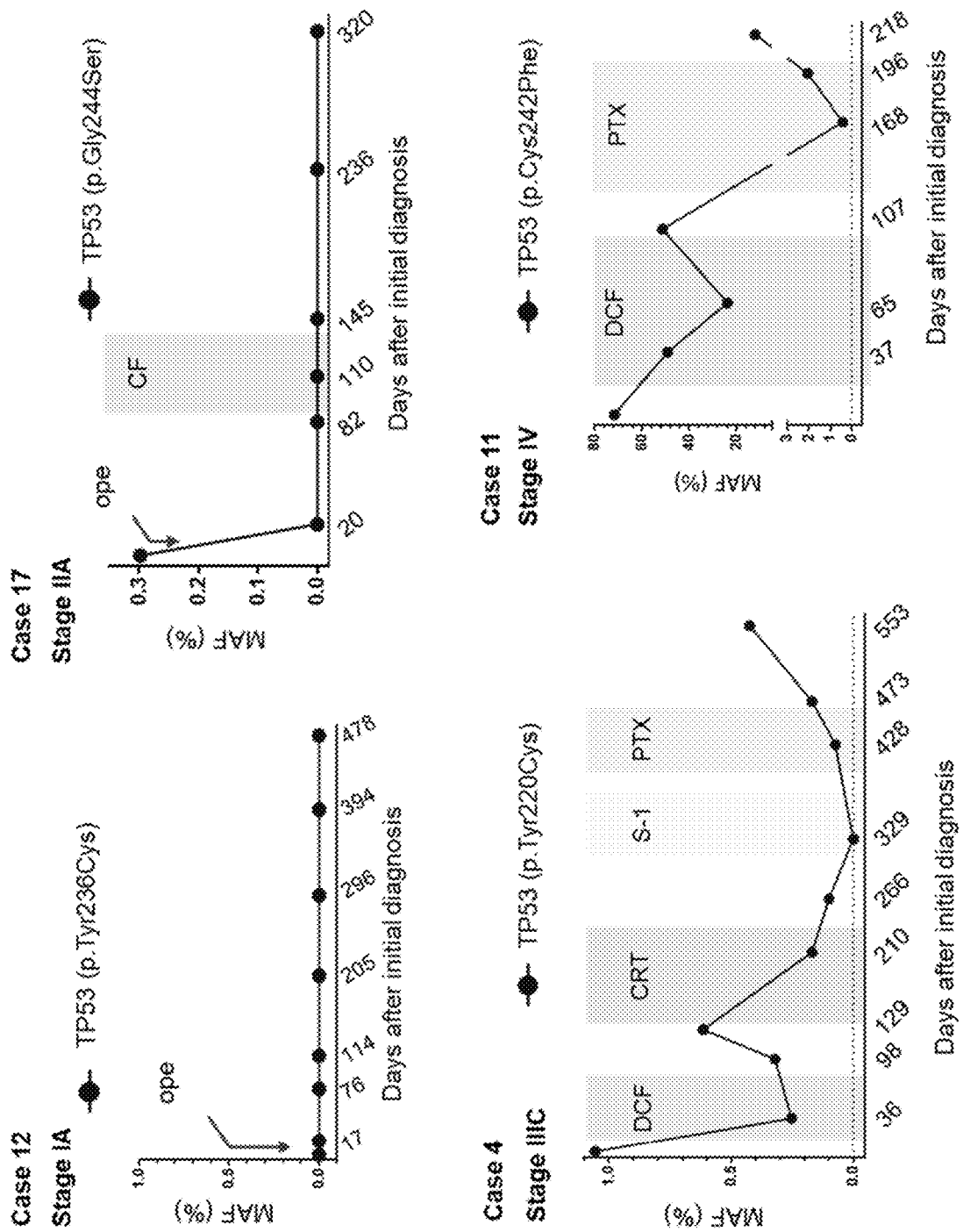
[Fig.5]

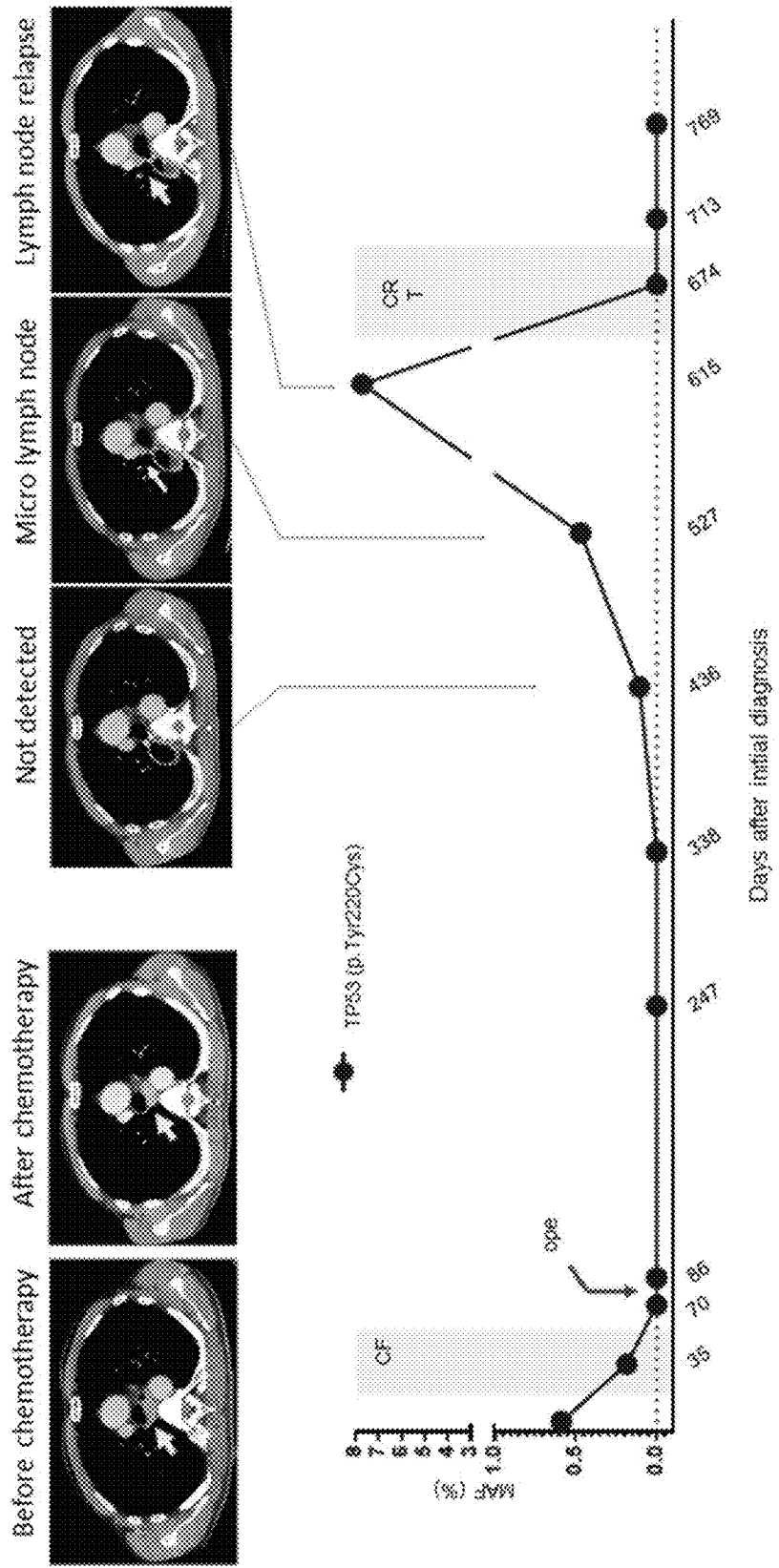

PROBE/PRIMER LIBRARY FOR DIAGNOSIS OF CANCER

TECHNICAL FIELD

The present invention relates to a method for diagnosis of cancer. More specifically, the present invention relates to a probe and a primer for detecting a mutation in the TP53 gene useful for early diagnosis of relapse of cancer (especially esophageal cancer, gastric cancer, and colorectal cancer).

REFERENCE TO A SEQUENCE LISTING SUBMITTED ELECTRONICALLY VIA EFS-WEB

The content of the electronically submitted Sequence Listing (Name: P210073US00 Sequence_Lising.txt; Size: 10,748 bytes; and Date of Creation: Jul. 12, 2018>) is herein incorporated by reference in its entirety.

BACKGROUND ART

Attempts of utilizing circulating DNAs derived from tumor cells contained in peripheral blood (circulating tumor DNAs, ctDNAs) for diagnosis of cancers are being examined. For example, in Non-patent document 1, DNAs were extracted from pre- and post-operational plasmas, primary tumors, and samples containing peripheral blood mononuclear cells (PBMC) obtained from 44 individuals having a tumor in the large intestine and received a curative resection, and mutations peculiar to tumors, mutation spectrum of tumors, change of allele frequency of mutations in ctDNAs observed after the curative resection of tumors, and so forth were examined. Patent documents 1 and 2 propose, for a method for monitoring tumor burden, use of copy number of DNA fragments of genes having a mutation measured in a blood sample of a patient as an index of tumor burden of the patient. Patent document 3 proposes, as a method for detecting a K-ras gene mutation, a method utilizing the PNA-clamping method and direct sequencing in combination, and describes that, according to this method, treatment susceptibility of a patient for a molecular targeted drug to the K-ras gene can be evaluated by using blood as a test material substituting for a cancer tissue. Patent document 4 proposes, as a noninvasive diagnosis method of ovarian clear cell adenocarcinoma, detection of amplification or deletion in some of chromosomal DNA regions on the basis of a finding that such an amplification or deletion correlates with onset, malignancy, prognosis, etc. of ovarian clear cell adenocarcinoma, and describes that the chromosomal DNAs to be obtained from a patient may be extracted from blood.

Further, there is the TP53 gene as one of genes known as antioncogenes. Use of mutations of the TP53 gene as biomarkers for diagnosis and treatment of cancer is being examined. For example, Non-patent document 2 reported that, in patients with high-grade serious ovarian carcinoma (HGSOC), circulating DNAs derived from tumor cells (circulating tumor DNAs, ctDNAs) contained in peripheral blood at the time of the start of the treatment correlates with tumor volume, and reduction ratio of the TP53 gene mutant allele fraction (TP53MAF) less than 60% compared with before the treatment and observed after one cycle of chemotherapy relates to shortening of time to progression, and describes that these results indicate possibility of ctDNAs to be an early molecular response marker for HGSOC.

In the research of Non-patent document 1, digital PCR (dPCR) is used for detection of ctDNAs. In dPCR, a probe complementary to a specific sequence in a DNA fragment amplified with primers (usually one nucleotide) is used to detect the specific sequence at a high sensitivity (0.01 to 1%). Although highly sensitive detection of a specific sequence attracts attention in the field of medicine, especially in the field of cancer diagnosis, substantially the only technique that can respond to various characteristics including sensitivity required for the diagnosis, cost, test time, and requirement of repetitive test is dPCR.

PRIOR ART REFERENCES

Patent Documents

Patent document 1: Japanese Patent Unexamined Publication (KOHYO) No. 2011-529691
Patent document 2: Japanese Patent Unexamined Publication (KOKAI) No. 2016-104010
Patent document 3: Japanese Patent Unexamined Publication (KOKAI) No. 2012-135290
Patent document 4: Japanese Patent Unexamined Publication (KOKAI) No. 2016-198027

Non-Patent Documents

Non-patent document 1: Sato et al, PLoS One, 2016: PMID: 26727500 Non-patent document 2: Parkinson et al., PLoS Med, 13(12), 2016:e1002198

SUMMARY OF THE INVENTION

Object to be Achieved by the Invention

In the conventional detection of ctDNAs, a target specific sequence can be determined on the basis of results of preceding sequence analysis, public databases, literatures, and so forth, but for the highly sensitive detection based on dPCR, it is first required to design and synthesize primers and probes. Since the specific sequence generally differs depending on individuals or pathologies, the number of the types thereof is enormous, but frequency of each type in a population is low, and therefore objects for which a synthesized probe can be used are limited. In fact, commercially available dPCR probes are designed so that the nucleotides thereof are complementary to a continuous nucleotide sequence at intervals, i.e., intermittently, and lack flexibility except those for some highly frequent specific sequences. Therefore, even if a characteristic mutation derived from tumor cells is specified in an objective patient, existing dPCR probes cannot be used, and thus quick diagnosis is difficult.

Means for Achieving the Object

Therefore, in order to respond to many types of mutations, it is desirable to comprehensively prepare dPCR probes, and in order to respond to any type of mutation, it is still more desirable to prepare dPCR probes with non-intermittent complementarity.

By the way, the inventors of the present invention paid attention to mutations of the TP53 gene confirmed in about 50% of human cancers. Mutations of the TP53 gene are confirmed at especially high frequency in lung cancer, gastric cancer, colorectal cancer, breast cancer, and so forth, and according to the researches of the inventors of the present invention, it was found that the mutations were found in 87% of Japanese patients of esophageal cancer, gastric cancer, and colorectal cancer.

The inventors of the present invention also actually designed and synthesized 29 sets of probes and primers for dPCR for the TP53 gene, which are for detecting individual case-specific mutations. They also chosen some sets from a library consisting of such probe/primer sets, and used for monitoring of relapses in cancer patients. As a result, they found that such relapses may be diagnosed by the ctDNA analysis at an earlier stage than conventionally possible, and accomplished the present invention.

The present invention provides the followings.

[1] A library constituted by a plurality of probes and/or primers or primer pairs for detecting a genetic mutation relevant to a cancer in the region encoding the DNA binding domain of the TP53 gene, wherein:

the plurality of probes and/or primers or primer pairs include those for detecting c.524G>A, c.743G>A, c.818G>A, c.817C>T, c.742C>T, c.844C>T, c.637C>T, c.733G>A, c.747G>T, and c.659A>G.

[2] The library according to 1, which further comprises a plurality of probes and/or primers or primer pairs for detecting c.586C>T, c.469G>T, c.536A>G, c.488A>G, c.527G>T, c.818G>T, c.853G>A, c.734G>A, c.722C>T, c.578A>G, c.535C>T, c.856G>A, c.584T>C, c.574C>T, c.701A>G, c.814G>A, c.711G>A, c.713G>A, c.743G>T, c.473G>A, c.646G>A, c.832C>T, c.422G>A, c.527G>A, c.455C>T, c.473G>T, c.725G>T, c.833C>T, c.614A>G, and c.641A>G.

[3] The library according to 2, which further comprises a plurality of probes and/or primers or primer pairs for detecting c.734G>T, c.451C>T, c.797G>A, c.839G>A, c.839G>C, c.707A>G, c.733G>T, c.517G>T, c.404G>A, c.581T>G, c.796G>A, c.517G>A, c.380C>T, c.395A>G, c.824G>A, c.404G>T, c.730G>T, c.577C>T, c.638G>T, c.749C>T, c.772G>A, c.578A>T, c.824G>T, c.736A>G, c.797G>T, c.476C>T, c.725G>A, c.461G>T, c.481G>A, c.731G>A, c.638G>A, c.713G>T, c.715A>G, c.406C>T, c.493C>T, c.536A>T, c.811G>A, c.437G>A, c.438G>A, c.592G>T, c.430C>T, c.711G>T, c.730G>A, c.746G>T, c.610G>T, c.722C>G, c.329G>T, c.745A>T, c.814G>T, c.841G>C, c.396G>T, c.836G>A, c.838A>G, c.799C>T, c.830G>T, c.583A>T, c.832C>A, c.844C>G, c.452C>A, c.548C>G, c.569C>T, c.833C>G, c.396G>C, c.475G>C, c.499C>T, c.427G>A, c.644G>T, c.775G>T, c.700T>C, c.716A>G, c.745A>G, c.841G>A, c.298C>T, c.310C>T, c.820G>T, c.763A>T, c.821T>C, c.464C>A, c.467G>C, c.542G>A, c.580C>T, c.746G>C, c.818G>C, c.845G>A, c.772G>T, c.405C>G, c.541C>T, c.832C>G, c.856G>T, c.329G>C, c.413C>T, c.514G>T, c.584T>A, c.511G>T, c.811G>T, c.375G>T, c.523C>G, c.747G>C, c.394A>G, c.487T>A, c.800G>C, c.853G>T, c.738G>A, c.742C>G, c.785G>T, c.859G>T, c.375G>A, c.454C>T, c.487T>C, c.524G>T, c.725G>C, c.794T>C, c.839G>T, c.848G>C, c.388C>G, c.528C>G, c.535C>A, c.596G>T, c.643A>G, c.722C>A, c.796G>T, c.374C>T, c.377A>G, c.517G>C, c.523C>T, c.530C>T, c.817C>A, c.434T>A, c.463A>C, c.503A>G, c.535C>G, c.658T>A, c.700T>A, c.743G>C, c.843C>G, c.380C>A, c.400T>C, c.412G>C, c.421T>C, c.472C>T, c.473G>C, c.587G>C, c.706T>A, c.526T>A, c.526T>C, c.537T>A, c.542G>C, c.659A>C, c.731G>T, c.733G>C, c.843C>A, c.845G>C, c.857A>G, c.661G>T, c.434T>C, c.451C>G, c.490A>G, c.613T>G, c.718A>G, c.808T>C, c.809T>C, c.313G>T, c.388C>T, c.559G>A, c.623A>T, c.645T>G, c.658T>C, c.796G>C, c.809T>G, c.823T>C, c.840A>T, c.841G>T, c.847C>T, c.854A>T, c.328C>T, c.423C>G, c.451C>A, c.472C>G, c.518T>C, c.596G>A, c.755T>C, c.830G>A, c.833C>A, c.842A>G, c.497C>G, c.395A>T, c.470T>G, c.530C>G, c.578A>C, c.632C>T, c.712T>C, and c.746G>A.

[4] The library according to any one of 1 to 3, which enables detection of all the mutations at 585 positions in the DNA binding domain of the TP53 gene with a plurality of probes.

[5] The library according to 1 or 2, which is for prediction of relapse or prognosis of cancer in a test subject after a treatment of the cancer.

[6] The library according to any one of 1 to 5, which is for detecting a circulating DNA derived from a tumor cell (circulating tumor DNA, ctDNA).

[7] The library according to any one of 1 to 6, wherein the probes and/or primers or primer pairs are for digital PCR.

[8] The library according to any one of 1 to 7, wherein the probes and/or primers or primer pairs include an oligonucleotide consisting of any one of the sequences of SEQ ID NOS: 1 to 116 or a labeled product thereof.

[9] A method for analyzing genetic mutation relevant to a cancer in the region encoding the DNA binding domain of the TP53 gene in a test subject, the method comprising the following (1) to (3):

(1) preparing a library constituted by a plurality of probes and/or primers or primer pairs, wherein the plurality of probes and/or primers or primer pairs include those for detecting mutations of c.524G>A, c.743G>A, c.818G>A, c.817C>T, c.742C>T, c.844C>T, c.637C>T, c.733G>A, c.747G>T, and c.659A>G;

(2) selecting a probe and/or primer or primer pair for detecting one mutation from the prepared library; and (3) analyzing a mutation in a nucleic acid obtained from the test subject by digital PCR using the selected probe and/or primer or primer pair.

[10] The method according to 9, wherein the cancer is esophageal cancer, gastric cancer, or colorectal cancer.

[11] The method according to 9 or 10, wherein the one mutation to be selected is a mutation identified in a primary lesion of the test subject before a treatment, and the mutation in a circulating DNA derived from a tumor cell (circulating tumor DNA, ctDNA) obtained from blood of the test subject after the treatment is analyzed.

[12] A method for producing the library according to any one of 1 to 8, the method comprising:

preparing a probe and/or primer or primer pair for detecting one mutation relevant to a cancer in the DNA binding domain of the TP53 gene, and preparing a probe and/or primer or primer pair for detecting another mutation relevant to a cancer in the DNA binding domain of the TP53 gene and different from the aforementioned mutation.

[13] A set of primer pair and probe pair for use in digital PCR, which is any one of those of the following (1) to (9):

(1) a primer pair consisting of the sequences of SEQ ID NOS: 1 and 2, and a probe pair of oligonucleotides consisting of the sequences of

[Formula 1]

(SEQ ID NO: 3)
CCTX$_1$TGTGCG CCG*GTCT (SEQ ID NO: 4)
TCCTX$_1$TGTGC GCX$_1$X$_2$ *GTCT, each of which may be a labeled product thereof, (2) a primer pair consisting of the sequences of SEQ ID NOS: 5 and 6, and a probe pair of oligonucleotides consisting of the sequences of

[Formula 2]

(SEQ ID NO: 7)
ACCACCACAX$_1$ TX$_2$TGTX$_1$G*X$_2$X$_2$A AG (SEQ ID NO: 8)
ACCACCAX$_1$X$_2$X$_1$ T X$_2$TGTX$_1$A*X$_2$X$_2$A AG, each of which may be a labeled product thereof, (3) a primer pair consisting of the sequences of SEQ ID NOS: 9 and 10, and a probe pair of oligonucleotides consisting of the sequences of

[Formula 3]

(SEQ ID NO: 11)
TGGTGX$_1$CX$_1$TA *TGX$_2$GCCG (SEQ ID NO: 12)
TGGTGX$_1$CX$_1$TG *TGX$_2$GCC, each of which may be a labeled product thereof, (4) a primer pair consisting of the sequences of SEQ ID NOS: 13 and 14, and a probe pair of oligonucleotides consisting of the sequences of

[Formula 4]

(SEQ ID NO: 15)
TTGTGX$_2$GGCGX$_1$TG *CCCC (SEQ ID NO: 16)
TTGTGX$_2$GGCG X$_1$TA *CCCCC, each of which may be a labeled product thereof, (5) a primer pair consisting of the sequences of SEQ ID NOS: 17 and 18, and a probe pair of oligonucleotides consisting of the sequences of

[Formula 5]

(SEQ ID NO: 19)
TGTAACAGTTX$_1$X$_1$TG *X$_1$X$_2$TGGGC (SEQ ID NO: 20)
TGTX$_2$AX$_1$X$_2$GTTX$_1$X$_1$TT *X$_1$X$_2$TGGGC, each of which may be a labeled product thereof, (6) a primer pair consisting of the sequences of SEQ ID NOS: 21 and 22, and a probe pair of oligonucleotides consisting of the sequences of

[Formula 6]

(SEQ ID NO: 23)
TGGX$_2$GTA*TTTGGX$_2$TGX$_2$X$_1$X$_2$GX$_2$AACA (SEQ ID NO: 24)
TGGX$_2$GTG*TTTGGX$_2$TGX$_2$CX$_2$GX$_2$AAC, each of which may be a labeled product thereof, (7) a primer pair consisting of the sequences of SEQ ID NOS: 25 and 26, and a probe pair of oligonucleotides consisting of the sequences of

[Formula 7]

(SEQ ID NO: 27)
CCTX$_1$X$_1$GTCX$_2$TGTGX$_1$TG*TGA (SEQ ID NO: 28)
ACCTX$_1$X$_1$GTX$_1$X$_2$TGTGX$_1$TA*TGA each of which may be a labeled product thereof, (8) a primer pair consisting of the sequences of SEQ ID NOS: 29 and 30, and a probe pair of oligonucleotides consisting of the sequences of

[Formula 8]

(SEQ ID NO: 31)
CCCTGGTX$_2$GGTTTTX$_1$TG*GGAAG (SEQ ID NO: 32)
TGCCCTGGTAGGTTTTCTX$_2$*GGAAG each of which may be a labeled product thereof, and (9) a primer pair consisting of the sequences of SEQ ID NOS: 33 and 34, and a probe pair of oligonucleotides consisting of the sequences of

[Formula 9]

(SEQ ID NO: 35)
ACCTX$_1$X$_2$A* X$_2$GCTGTTCCGTCC (SEQ ID NO: 36)
CCTX$_1$AC*AGCTGTTCX$_1$GTCC each of which may be a labeled product thereof ($X_1$ and $X_2$ each indicate modified nucleotides, and the symbols * indicate nucleotides corresponding to a position of mutation).

[14] A set of probes and primers for use in digital PCR, which consists of any one of the following sets of oligonucleotides, each of which may be a labeled product thereof:
oligonucleotides consisting of the sequences of SEQ ID NOS: 1 to 4 for detecting a mutation at c.844,
oligonucleotides consisting of the sequences of SEQ ID NOS: 5 to 8 for detecting a mutation at c.637,
oligonucleotides consisting of the sequences of SEQ ID NOS: 9 to 12 for detecting a mutation at c.659,
oligonucleotides consisting of the sequences of SEQ ID NOS: 13 to 16 for detecting a mutation at c.527,
oligonucleotides consisting of the sequences of SEQ ID NOS: 17 to 20 for detecting a mutation at c.725,
oligonucleotides consisting of the sequences of SEQ ID NOS: 21 to 24 for detecting a mutation at c.614,
oligonucleotides consisting of the sequences of SEQ ID NOS: 25 to 28 for detecting a mutation at c.499,
oligonucleotides consisting of the sequences of SEQ ID NOS: 29 to 32 for detecting a mutation at c.298, and
oligonucleotides consisting of the sequences of SEQ ID NOS: 33 to 36 for detecting a mutation at c.809.

The present invention also provides the followings.

[1] A library constituted by a plurality of probes and/or primers or primer pairs, which is for detecting a mutation relevant to a cancer in the DNA binding domain of the TP53 gene.

[2] The library according to 1, wherein the mutation relevant to a cancer is a mutation at any position selected from the group consisting of c.298, c.329, c.380, c.399_400 insert, c.475, c.499, c.524, c.527, c.536, exon5 splicesite_3, c.574, c.578, c.586, c.614, c.637, c.659, c.707, c.725, c.730, c.736, c.743, c.764, c.780, c.809, c.818, c.839, c.844, and c.993.

[3] The library according to 1 or 2, wherein the plurality of probes and/or primers or primer pairs include those for detecting a mutation at any position selected from the group consisting of c.524, c.527, c.536, c.578, c.614, c.637, c.659, c.725, c.730, c.743, and c.818.

[4] The library according to any one of 1 to 3, which enables non-intermittent detection of mutation with a plurality of probes.

[5] The library according to 1 or 2, which is for prediction of relapse or prognosis of cancer in a test subject after a treatment of the cancer.

[6] The library according to any one of 1 to 5, which is for detecting circulating DNAs derived from tumor cells (circulating tumor DNAs, ctDNAs).

[7] The library according to any one of 1 to 6, wherein the probes and/or primers or primer pairs are for digital PCR.

[8] The library according to any one of 1 to 7, wherein the probes and/or primers or primer pairs include an oligonucleotide consisting of any one of the sequences of SEQ ID NOS: 1 to 116 or a labeled product thereof.

[9] A method for assisting prediction of relapse or prognosis of cancer in a test subject after a treatment of the cancer, the method comprising:
preparing at least one probe and/or primer or primer pair from the library according to any one of 1 to 6, and
analyzing a mutation in a nucleic acid obtained from the test subject by digital PCR using the prepared probe and/or primer or primer pair.

[10] The method according to 9, wherein the cancer is esophageal cancer, gastric cancer, or colorectal cancer.

[11] The method according to 9 or 10, which comprises preparing a probe and/or primer or primer pair for detecting a mutation identified in a primary lesion of the test subject before the treatment, and analyzing the mutation in circulating DNAs derived from tumor cells (circulating tumor DNAs, ctDNAs) obtained from blood of the test subject after the treatment.

[13] An oligonucleotide consisting of any one of the sequences of SEQ ID NOS: 1 to 36, or a labeled product thereof.

[14] A set of probes and primers, which consists of any one of the following sets of oligonucleotides, each of which may be a labeled product thereof:
oligonucleotides consisting of the sequences of SEQ ID NOS: 1 to 4 for detecting a mutation at c.844,
oligonucleotides consisting of the sequences of SEQ ID NOS: 5 to 8 for detecting a mutation at c.637,
oligonucleotides consisting of the sequences of SEQ ID NOS: 9 to 12 for detecting a mutation at c.659,
oligonucleotides consisting of the sequences of SEQ ID NOS: 13 to 16 for detecting a mutation at c.527,
oligonucleotides consisting of the sequences of SEQ ID NOS: 17 to 20 for detecting a mutation at c.725,
oligonucleotides consisting of the sequences of SEQ ID NOS: 21 to 24 for detecting a mutation at c.614,
oligonucleotides consisting of the sequences of SEQ ID NOS: 25 to 28 for detecting a mutation at c.499,
oligonucleotides consisting of the sequences of SEQ ID NOS: 29 to 32 for detecting a mutation at c.298, and
oligonucleotides consisting of the sequences of SEQ ID NOS: 33 to 36 for detecting a mutation at c.809.

Effect of the Invention

By using the library of the present invention, about 90 percents of alimentary canal cancer patients can be diagnosed.

According to the present invention, early detection of relapse after a treatment is enabled.

According to the present invention, early detection of alimentary canal cancer can be expected.

BRIEF DESCRIPTION OF THE DRAWINGS

FIG. 1 Positions of mutated amino acids in TP53 found in 66 cases of esophageal cancer, gastric cancer, or colorectal cancer. The positions of mutation often overlap. In such cases, a plurality of cases can be analyzed with one designed probe/primer set.

FIG. 2 Positions of mutations in the TP53 gene found in 66 cases of esophageal cancer, gastric cancer, or colorectal cancer. The exons 4 to 9 of the TP53 gene are underlined. The positions of the mutation as the detection objects are marked with *, for which probes and primers for detection were synthesized in the examples.

FIG. 3 The results of operation check of 29 sets of the synthesized primers/probes. dPCR was performed for primary lesion (or plasma) DNAs. Mutated alleles (blue) and wild type alleles (red) were detected with all of them.

FIG. 4 A flowchart of a ctDNA monitoring experiment. For the case-specific mutations detected in the mutation analysis of primary lesions, probes for each of wild type DNA and mutant DNA are created, operations thereof are checked by using primary lesion DNAs, then plasma is extracted from a patient during process of the treatment, and ratio of the mutant DNAs, mutant allele frequency (%), therein is measured. Compared with the mutant DNAs in the plasma obtained before the treatment ((1)), reduction of the mutant DNAs (blue) was observed after the treatment ((2) and (3)).

FIG. 5 Monitoring of TP53 mutant DNAs in plasmas of stages I to IV esophageal cancer cases. MAF stands for mutant allele frequency; CF for cisplatin/5-FU; DCF for docetaxel/cisplatin/5-FU; CRT for chemoradiotherapy; and PTX for paclitaxel.

FIG. 6 Monitoring of ctDNAs in a stage IIA esophageal cancer relapse case. MAF stands for mutant allele frequency; CF for cisplatin/5-FU; and CRT for chemoradiotherapy.

MODES FOR CARRYING OUT THE INVENTION

The present invention provides a library for detecting a mutation relevant to a cancer.

[Library]

The term library means a group of a plurality of oligonucleotides for detecting mutations at a plurality of positions. The term plurality means a number of at least 2. The library is preferably such a group that enables detection of mutations at 5 or more positions, more preferably such a group that enables detection of mutations at 10 or more positions, further preferably such a group that enables detection of mutations at 20 or more positions. In view of enabling non-intermittent detection of mutations in the portion encoding the DNA binding domain of the TP53 gene (195 amino acid length), the library is preferably one that enables detection of mutations at all the 585 positions. The library comprises a plurality of oligonucleotides in order to detect mutations at a plurality of positions, but it can be used in various ways. When it is used in order to analyze a target mutation (one position) for one test subject, it may be used for, for example, judging whether a mutation detected in a primary lesion before a treatment for a certain patient is detected in blood during process of the treatment. The library may also be used in order to analyze mutations at a plurality of positions for one test subject. The library may further be used in order to analyze a target mutation (one position) for a plurality of test subjects, in order to analyze a plurality of mutations for each of a plurality of test subjects, or the like. The term mutation used in the explanations of the present invention means a mutation of base (also expressed as nucleotide), unless especially indicated.

The oligonucleotides included in the library are a primer or primer pair for amplifying a portion including a mutation, a probe for detecting a mutation, or the like. The library may consist only of oligonucleotides that can function as a primer, consist of only oligonucleotides that can function as a probe, or consists of both of the foregoing types of oligonucleotides. A mutation is usually detected by amplifying a portion that may contain the target mutation by the polymerase chain reaction (PCR) in nucleic acids, and detecting the target mutation in the amplified product using a probe. Therefore, the library preferably includes a probe and primer pair for the target mutation as a set. The term amplification product means DNAs amplified by PCR in the case of PCR, and may also be called amplicon.

The probe included in the library may also be one for detecting a sequence not having the target mutation (wild type), or may be one for detecting a sequence having the target mutation (mutant). The library may include both types of probes.

The primer included in the library is for amplifying a portion including the position of the target mutation in a nucleic acid contained in a sample, and it is usually preferably included in the library as a pair of forward primer corresponding to a plus strand, and reverse primer corresponding to a minus strand.

The primer and probe included in the library are for detecting a mutation relevant to a cancer. The mutation relevant to a cancer is a mutation highly frequently observed in a population of DNAs derived from a tumor site of a cancer patient. The expression that a mutation is highly frequently observed means that the mutation is observed in 5% or more, preferably 10% or more, more preferably 30% or more, of cancer patients.

The mutation relevant to a cancer is preferably a mutation of the TP53 gene, more preferably a mutation in the portion encoding the DNA binding domain of the TP53 gene.

The p53 tumor suppressor protein (intranuclear protein consisting of 393 amino acids) encoded by the TP53 gene is an important transcription suppression factor that responds to various cell stresses such as DNA damage, ultraviolet irradiation, and hypoxia. p53 controls the cell processes required for life support such as DNA repair, advance of cell cycle, angiogensis, and apoptosis, and activation thereof may start downstream pathways from various molecules in affected cells. These p53-dependent pathways suppress proliferation of damaged cells through arresting cell cycle or apoptosis. Loss or inhibition of the functions and activity of p53 is a factor that contributes to many cases of cancer.

The library preferably includes a plurality of probes and/or primers or primer pairs for detecting a mutation at any position selected from the group consisting of c.298, c.329, c.380, c.399_400 insert, c.475, c.499, c.524, c.527, c.536, exon5 splicesite_3, c.574, c.578 (including p.His193Arg and p.His193Leu), c.586, c.614, c.637, c.659, c.707, c.725, c.730, c.736, c.743, c.764, c.780, c.809, c.818, c.839, c.844, and c.993, which has been elucidated to be highly frequently found in the TP53 gene by the researches of the inventors of the present invention. More specifically, the library includes a plurality of probes and/or primers or primer pairs for detecting a mutation that has been elucidated to be highly frequently found in the TP53 gene by the researches of the inventors of the present invention, i.e., any mutation selected from the group consisting of c.298C>T, c.329G>T, c.380C>T, c.399_400 insert CAAGATG, c.475G>C, c.499C>T, c.524G>A, c.527G>A, c.536A>G, exon5 splicesite_3, c.574G>A, c.578A>G, c.578A>T, c.586C>T, c.614A>G, c.637C>T, c.659A>G, c.707A>G, c.725G>T, c.730G>A, c.736A>T, c.743G>A, c.764T>C, c.780_780delC, c.809T>G, c.818G>A, c.839G>C, c.844C>T, and c.993C>T. The term any is distinguished from the term any one, and the number of the objects referred to with the term any is an arbitrary number, and is not limited to one, but may be a plural number.

The library more preferably includes a plurality of probes and/or primers or primer pairs for detecting a mutation at any position selected from the group consisting of at least c.524, c.527, c.536, c.578, c.614, c.637, c.659, c.725, c.730, c.743, and c.818, more specifically, any of the aforementioned specific mutations at these positions.

The library more preferably includes a set of probes and primer pairs for detecting all mutations at the aforementioned 11 positions, more specifically, all the aforementioned specific mutations at these positions.

p53 is divided into several domains according to the functions thereof, and the domain where mutations are seen at the highest frequency is the DNA binding domain, of which mutations account for about 86% of all the mutations. According to the examination of the inventors of the present invention, 39 mutations (98%) among the 40 mutations that could be identified existed in the DNA binding domain. The DNA binding domain of p53 consists of 196 amino acids, and mutations are reported for all the amino acids. Therefore, it is considered that, if there is a library of oligonucleotides that covers all the mutations that can occur in the DNA binding domain, i.e., a library for non-intermittently detecting mutations that can occur in the DNA binding domain, it enables effective diagnosis for a considerable number of cancer patients.

Therefore, one of the most preferred libraries is one that enables non-intermittent detection of the mutations that can occur in the DNA binding domain. The objects of such a library are mutations of 195 amino acids of the coding region. If each set includes a primer pair, a probe for wild type, and a probe for a mutant, the library should cover 2,340 of theoretical detection object bases. If primers and probes for these are synthesized, they can constitute a library that enables effective diagnosis for about 90% of cancer patients with TP53 mutation. Therefore, one of the most preferred libraries is one that enables non-intermittent detection of the mutations that can occur in the DNA binding domain of TP53 gene. Specifically, it is a set of 1755 of primers and probes that enables detection of 2,340 of theoretical detection object bases. Another example is a set of about 800 of primers and probes for the about 800 mutations reported for digestive system cancers. According to the examination of the inventors of the present invention, if the objects are all the cancers, 30% of the TP53 mutations can be covered with top ten kinds of mutations as for reported numbers among the 1284 kinds of TP53 point mutations (total 25,376 mutations) (the same shall apply below), 40% with top 20 kinds, 50% with top 40 kinds, 60% with top 80 kinds, and 80% with top 232 kinds. The inventors of the present invention already synthesized 4 kinds among the top 10 kinds, and 6 kinds among the top 20 kinds, and confirmed the usefulness thereof, until the present. The ranking of the reported numbers summarized by the inventors of the present invention is shown below.

TABLE 1

| Rank | CDS Mutation | Fraction (%) | Cumulative (%) |
|---|---|---|---|
| 1 | c.524G>A | 5.978 | 5.978 |
| 2 | c.743G>A | 4.094 | 10.072 |
| 3 | c.818G>A | 3.873 | 13.945 |
| 4 | c.817C>T | 3.657 | 17.602 |
| 5 | c.742C>T | 3.318 | 20.920 |
| 6 | c.844C>T | 2.865 | 23.784 |
| 7 | c.637C>T | 2.116 | 25.900 |
| 8 | c.733G>A | 2.025 | 27.926 |
| 9 | c.747G>T | 1.840 | 29.766 |
| 10 | c.659A>G | 1.706 | 31.472 |
| 11 | c.586C>T | 1.391 | 32.863 |
| 12 | c.469G>T | 0.989 | 33.852 |
| 13 | c.536A>G | 0.875 | 34.727 |
| 14 | c.488A>G | 0.820 | 35.547 |
| 15 | c.527G>T | 0.804 | 36.350 |
| 16 | c.818G>T | 0.788 | 37.138 |
| 17 | c.853G>A | 0.776 | 37.915 |
| 18 | c.734G>A | 0.717 | 38.632 |
| 19 | c.722C>T | 0.615 | 39.247 |
| 20 | c.578A>G | 0.607 | 39.853 |
| 21 | c.535C>T | 0.587 | 40.441 |
| 22 | c.856G>A | 0.548 | 40.988 |
| 23 | c.584T>C | 0.536 | 41.524 |
| 24 | c.574C>T | 0.532 | 42.056 |
| 25 | c.701A>G | 0.528 | 42.584 |
| 26 | c.814G>A | 0.516 | 43.100 |
| 27 | c.711G>A | 0.504 | 43.605 |
| 28 | c.713G>A | 0.500 | 44.105 |
| 29 | c.743G>T | 0.485 | 44.590 |
| 30 | c.473G>A | 0.457 | 45.047 |
| 31 | c.646G>A | 0.453 | 45.500 |
| 32 | c.832C>T | 0.449 | 45.949 |
| 33 | c.422G>A | 0.441 | 46.391 |
| 34 | c.527G>A | 0.437 | 46.828 |
| 35 | c.455C>T | 0.430 | 47.257 |
| 36 | c.473G>T | 0.430 | 47.687 |
| 37 | c.725G>T | 0.426 | 48.113 |
| 38 | c.833C>T | 0.422 | 48.534 |
| 39 | c.614A>G | 0.414 | 48.948 |
| 40 | c.641A>G | 0.414 | 49.362 |
| 41 | c.734G>T | 0.410 | 49.771 |
| 42 | c.451C>T | 0.402 | 50.173 |
| 43 | c.797G>A | 0.402 | 50.575 |
| 44 | c.839G>A | 0.386 | 50.961 |
| 45 | c.839G>C | 0.382 | 51.344 |
| 46 | c.707A>G | 0.378 | 51.722 |
| 47 | c.733G>T | 0.370 | 52.092 |
| 48 | c.517G>T | 0.366 | 52.459 |
| 49 | c.404G>A | 0.363 | 52.821 |
| 50 | c.581T>G | 0.363 | 53.184 |
| 51 | c.796G>A | 0.347 | 53.531 |
| 52 | c.517G>A | 0.335 | 53.866 |
| 53 | c.380C>T | 0.323 | 54.189 |
| 54 | c.395A>G | 0.319 | 54.508 |
| 55 | c.824G>A | 0.311 | 54.819 |
| 56 | c.404G>T | 0.307 | 55.126 |
| 57 | c.730G>T | 0.288 | 55.414 |
| 58 | c.577C>T | 0.284 | 55.698 |
| 59 | c.638G>T | 0.280 | 55.978 |
| 60 | c.749C>T | 0.276 | 56.253 |
| 61 | c.772G>A | 0.276 | 56.529 |
| 62 | c.578A>T | 0.272 | 56.801 |
| 63 | c.824G>T | 0.268 | 57.069 |
| 64 | c.736A>G | 0.264 | 57.333 |
| 65 | c.797G>T | 0.264 | 57.597 |
| 66 | c.476C>T | 0.260 | 57.857 |
| 67 | c.725C>A | 0.260 | 58.117 |
| 68 | c.461G>T | 0.256 | 58.373 |
| 69 | c.481G>A | 0.256 | 58.630 |
| 70 | c.731G>A | 0.256 | 58.886 |
| 71 | c.638G>A | 0.252 | 59.138 |
| 72 | c.713G>T | 0.252 | 59.390 |
| 73 | c.715A>G | 0.248 | 59.638 |
| 74 | c.406C>T | 0.248 | 59.887 |
| 75 | c.493C>T | 0.244 | 60.131 |
| 76 | c.536A>T | 0.240 | 60.371 |
| 77 | c.811G>A | 0.240 | 60.612 |
| 78 | c.437G>A | 0.240 | 60.852 |
| 79 | c.438G>A | 0.225 | 61.077 |
| 80 | c.592G>T | 0.221 | 61.297 |
| 81 | c.430C>T | 0.217 | 61.514 |
| 82 | c.711G>T | 0.213 | 61.727 |
| 83 | c.730G>A | 0.213 | 61.939 |
| 84 | c.746G>T | 0.213 | 62.152 |
| 85 | c.610G>T | 0.213 | 62.365 |
| 86 | c.722C>G | 0.209 | 62.574 |
| 87 | c.329C>T | 0.205 | 62.779 |
| 88 | c.745A>T | 0.197 | 62.976 |
| 89 | c.814G>T | 0.197 | 63.173 |
| 90 | c.841G>C | 0.197 | 63.370 |
| 91 | c.396G>T | 0.189 | 63.559 |
| 92 | c.836G>A | 0.189 | 63.748 |
| 93 | c.838A>G | 0.189 | 63.937 |
| 94 | c.799C>T | 0.185 | 64.122 |
| 95 | c.830G>T | 0.185 | 64.308 |
| 96 | c.583A>T | 0.181 | 64.489 |
| 97 | c.832C>A | 0.181 | 64.670 |
| 98 | c.844C>G | 0.181 | 64.851 |
| 99 | c.452C>A | 0.177 | 65.029 |
| 100 | c.548C>G | 0.177 | 65.206 |
| 101 | c.569C>T | 0.173 | 65.379 |
| 102 | c.833C>G | 0.173 | 65.553 |
| 103 | c.396C>G | 0.169 | 65.722 |
| 104 | c.475G>C | 0.169 | 65.892 |
| 105 | c.499C>T | 0.169 | 66.061 |
| 106 | c.427G>A | 0.165 | 66.227 |
| 107 | c.644G>T | 0.165 | 66.392 |
| 108 | c.775G>T | 0.165 | 66.558 |
| 109 | c.700T>C | 0.162 | 66.719 |
| 110 | c.716A>G | 0.162 | 66.881 |
| 111 | c.745A>G | 0.162 | 67.042 |
| 112 | c.841G>A | 0.162 | 67.204 |
| 113 | c.298C>T | 0.162 | 67.365 |
| 114 | c.310C>T | 0.158 | 67.523 |
| 115 | c.820G>T | 0.154 | 67.677 |
| 116 | c.763A>T | 0.150 | 67.826 |
| 117 | c.821T>C | 0.150 | 67.976 |
| 118 | c.464C>A | 0.146 | 68.122 |
| 119 | c.467G>C | 0.146 | 68.268 |
| 120 | c.542G>A | 0.146 | 68.414 |
| 121 | c.580C>T | 0.146 | 68.559 |
| 122 | c.746G>C | 0.146 | 68.705 |
| 123 | c.818G>C | 0.146 | 68.851 |
| 124 | c.845G>A | 0.146 | 68.997 |
| 125 | c.772G>T | 0.146 | 69.143 |
| 126 | c.405C>G | 0.142 | 69.284 |
| 127 | c.541C>T | 0.138 | 69.422 |
| 128 | c.832C>G | 0.138 | 69.560 |
| 129 | c.856G>T | 0.138 | 69.698 |
| 130 | c.329G>C | 0.134 | 69.832 |
| 131 | c.413C>T | 0.134 | 69.966 |
| 132 | c.514G>T | 0.134 | 70.100 |
| 133 | c.584T>A | 0.130 | 70.230 |
| 134 | c.511G>T | 0.130 | 70.360 |
| 135 | c.811G>T | 0.130 | 70.490 |
| 136 | c.375G>T | 0.126 | 70.616 |
| 137 | c.523C>G | 0.126 | 70.742 |
| 138 | c.747G>C | 0.126 | 70.868 |
| 139 | c.394A>G | 0.122 | 70.991 |
| 140 | c.487T>A | 0.122 | 71.113 |
| 141 | c.800G>C | 0.122 | 71.235 |
| 142 | c.853G>T | 0.122 | 71.357 |
| 143 | c.738G>A | 0.118 | 71.475 |
| 144 | c.742C>G | 0.118 | 71.594 |
| 145 | c.785G>T | 0.118 | 71.712 |
| 146 | c.859G>T | 0.118 | 71.830 |
| 147 | c.375G>A | 0.114 | 71.944 |
| 148 | c.454C>T | 0.114 | 72.058 |
| 149 | c.487T>C | 0.114 | 72.173 |
| 150 | c.524G>T | 0.114 | 72.287 |

TABLE 1-continued

| Rank | CDS Mutation | Fraction (%) | Cumulative (%) |
|---|---|---|---|
| 151 | c.725G>C | 0.114 | 72.401 |
| 152 | c.794T>C | 0.114 | 72.516 |
| 153 | c.839G>T | 0.114 | 72.630 |
| 154 | c.848G>C | 0.114 | 72.744 |
| 155 | c.388C>G | 0.110 | 72.854 |
| 156 | c.528C>G | 0.110 | 72.965 |
| 157 | c.535C>A | 0.110 | 73.075 |
| 158 | c.596G>T | 0.110 | 73.185 |
| 159 | c.643A>G | 0.110 | 73.296 |
| 160 | c.722C>A | 0.110 | 73.406 |
| 161 | c.796G>T | 0.110 | 73.516 |
| 162 | c.374C>T | 0.106 | 73.623 |
| 163 | c.377A>G | 0.106 | 73.729 |
| 164 | c.517G>C | 0.106 | 73.836 |
| 165 | c.523C>T | 0.106 | 73.942 |
| 166 | c.530C>T | 0.106 | 74.048 |
| 167 | c.817C>A | 0.106 | 74.155 |
| 168 | c.434T>A | 0.102 | 74.257 |
| 169 | c.463A>C | 0.102 | 74.360 |
| 170 | c.503A>G | 0.102 | 74.462 |
| 171 | c.535C>G | 0.102 | 74.565 |
| 172 | c.658T>A | 0.102 | 74.667 |
| 173 | c.700T>A | 0.102 | 74.769 |
| 174 | c.743G>C | 0.102 | 74.872 |
| 175 | c.843G>C | 0.102 | 74.974 |
| 176 | c.380C>A | 0.099 | 75.073 |
| 177 | c.400T>C | 0.099 | 75.171 |
| 178 | c.412G>C | 0.099 | 75.270 |
| 179 | c.421T>C | 0.099 | 75.368 |
| 180 | c.472C>T | 0.099 | 75.467 |
| 181 | c.473C>G | 0.099 | 75.565 |
| 182 | c.587G>C | 0.099 | 75.664 |
| 183 | c.706T>A | 0.099 | 75.762 |
| 184 | c.526T>A | 0.095 | 75.857 |
| 185 | c.526T>C | 0.095 | 75.952 |
| 186 | c.537T>A | 0.095 | 76.046 |
| 187 | c.542G>C | 0.095 | 76.141 |
| 188 | c.659A>C | 0.095 | 76.235 |
| 189 | c.731G>T | 0.095 | 76.330 |
| 190 | c.733G>C | 0.095 | 76.424 |
| 191 | c.843C>A | 0.095 | 76.519 |
| 192 | c.845G>C | 0.095 | 76.614 |
| 193 | c.857A>G | 0.095 | 76.708 |
| 194 | c.661G>T | 0.095 | 76.803 |
| 195 | c.434T>C | 0.091 | 76.893 |
| 196 | c.451C>G | 0.091 | 76.984 |
| 197 | c.490A>G | 0.091 | 77.075 |
| 198 | c.613T>G | 0.091 | 77.165 |
| 199 | c.718A>G | 0.091 | 77.256 |
| 200 | c.808T>C | 0.091 | 77.347 |
| 201 | c.809T>C | 0.091 | 77.437 |
| 202 | c.313G>T | 0.087 | 77.524 |
| 203 | c.388C>T | 0.087 | 77.611 |
| 204 | c.559G>A | 0.087 | 77.697 |
| 205 | c.623A>T | 0.087 | 77.784 |
| 206 | c.645T>G | 0.087 | 77.871 |
| 207 | c.658T>C | 0.087 | 77.957 |
| 208 | c.796G>C | 0.087 | 78.044 |
| 209 | c.809T>G | 0.087 | 78.131 |
| 210 | c.823T>C | 0.087 | 78.217 |
| 211 | c.840A>T | 0.087 | 78.304 |
| 212 | c.841G>T | 0.087 | 78.391 |
| 213 | c.847C>T | 0.087 | 78.477 |
| 214 | c.854A>T | 0.087 | 78.564 |
| 215 | c.328C>T | 0.083 | 78.647 |
| 216 | c.423C>G | 0.083 | 78.730 |
| 217 | c.451C>A | 0.083 | 78.812 |
| 218 | c.472C>G | 0.083 | 78.895 |
| 219 | c.518T>C | 0.083 | 78.978 |
| 220 | c.596G>A | 0.083 | 79.061 |
| 221 | c.755T>C | 0.083 | 79.143 |
| 222 | c.830G>T | 0.083 | 79.226 |
| 223 | c.833C>A | 0.083 | 79.309 |
| 224 | c.842A>G | 0.083 | 79.392 |
| 225 | c.497C>G | 0.083 | 79.474 |
| 226 | c.395A>T | 0.079 | 79.553 |
| 227 | c.470T>G | 0.079 | 79.632 |
| 228 | c.530C>G | 0.079 | 79.711 |
| 229 | c.578A>C | 0.079 | 79.790 |
| 230 | c.632C>T | 0.079 | 79.868 |
| 231 | c.712T>C | 0.079 | 79.947 |
| 232 | c.746G>A | 0.079 | 80.026 |
| 233 | c.379T>C | 0.075 | 80.101 |
| 234 | c.403T>C | 0.075 | 80.176 |
| 235 | c.482C>A | 0.075 | 80.251 |
| 236 | c.644G>A | 0.075 | 80.325 |
| 237 | c.706T>C | 0.075 | 80.400 |
| 238 | c.752T>G | 0.075 | 80.475 |
| 239 | c.776A>T | 0.075 | 80.550 |
| 240 | c.817C>G | 0.075 | 80.625 |

As shown above, appearance (reported) frequencies of the mutations are significantly different. One of the most preferred libraries is one designed so that it enables detection of a plurality of kinds, for example, 2 or more kinds, preferably 4 or more kinds, more preferably 6 or more kinds, further preferably 10 or more kinds, still more preferably 20 or more kinds, of mutations of higher ranking among those mentioned below. The rankings of the mutations as the objects of the sets of primers and probes used in the section of Examples in this specification are as follows.

chr17:7579389 c.298C>T (p.Gln100Ter), 113rd place;
chr17:7579358 c.329G>T (p.Arg110Leu), 87th place;
chr17:7578550 c.380C>T (p.Ser127Phe), 53rd place;
chr17:7578526 c.399_400 insert CAAGATG (p.Phe134fs), out of ranking;
chr17:7578455 c.475G>C (p.Ala159Pro), 104th place;
chr17:7578431 c.499C>T (p.Gln167Ter), 105th place;
chr17:7578406 c.524C>T (p.Arg175His), 1st place;
chr17:7578403 c.527G>A (p.Cys176Tyr), 34th place;
chr17:7578394 c.536A>G (p.His179Arg), 13rd place;
chr17:7578370 exon5 splicesite_3 C>T, out of ranking;
chr17:7578275 c.574G>A (p.Gln192Ter), 24th place;
chr17:7578271 c.578A>G (p.His193Arg), 20th place;
chr17:7578271 c.578A>T (p.His193Leu), 62nd place;
chr17:7578263 c.586G>A (p.Arg196Ter), 11th place;
chr17:7578235 c.614A>G (p.Tyr205Cys), 39th place;
chr17:7578212 c.637C>T (p.Arg213Ter), 7th place;
chr17:7578190 c.659A>G (p.Tyr220Cys), 10th place;
chr17:7577574 c.707A>G (p.Tyr236Cys), 46th place;
chr17:7577556 c.725G>T (p.Cys242Phe), 37th place;
chr17:7577551 c.730G>A (p.Gly244Ser), 83rd place;
chr17:7577545 c.736A>T (p.Met246Leu), 455th place;
chr17:757753 c.743C>T (p.Arg248Gln), 2nd place;
chr17:7577517 c.764A>G (p.Ile255Thr), 278th place;
chr17:7577500 c.780_780delC (p.Ser260fs), out of ranking;
chr17:7577129 c.809T>G (p.Phe270Cys), 209th place;
chr17:7577120 c.818G>A (p.Arg273His), 3rd place;
chr17:7577099 c.839G>C (p.Arg280Thr), 45th place;
chr17:7577094 c.844G>A (p.Arg282Trp), 6th place;
chr17:7576853 c.993C>T (p.Gln331Ter), out of ranking (out of the DNA binding domain)

As for the ranking of the appearance frequency, the term high means, for example, a place not lower than the 10th place (1st to 10th places), not lower than the 40th place (1st to 40th places), or not lower than the 232nd place (1st to 232nd places). If mutations of an appearance frequency rank not lower than 10th place are targeted, a library that enables detection of at least 30% of TP53 mutations can be designed. Further, if mutations of an appearance frequency rank not lower than 40th place are targeted, a library that enables detection of at least 50% of TP53 mutations can be designed. Further, if mutations of an appearance frequency rank not lower than 232nd place are targeted, a library that enables detection of at least 80% of TP53 mutations can be designed.

One of specific examples of the library for detection of mutation of a high reported number rank include any one set, preferably any two sets, among the following 3 sets, more preferably all the following 3 sets:
- at least one oligonucleotide consisting of any of the sequences of SEQ ID NOS: 1 to 4 for detecting a mutation at c.844,
- at least one oligonucleotide consisting of any of the sequences of SEQ ID NOS: 5 to 8 for detecting a mutation at c.637, and
- at least one oligonucleotide consisting of any of the sequences of SEQ ID NOS: 9 to 12 for detecting a mutation at c.659.

If the library includes all the sets for detection of mutations of an appearance frequency rank not lower than the 10th place, which are represented by these three sets, it can be expected to enable detection of at least 30% of the TP53 mutations.

The library preferably includes any one set, preferably any two sets, among the following 3 sets, more preferably all the following 3 sets, in addition to the aforementioned 3 sets:
- at least one oligonucleotide consisting of any of the sequences of SEQ ID NOS: 13 to 16 for detecting a mutation at c.527,
- at least one oligonucleotide consisting of any of the sequences of SEQ ID NOS: 17 to 20 for detecting a mutation at c.725, and
- at least one oligonucleotide consisting of any of the sequences of SEQ ID NOS: 21 to 24 for detecting a mutation at c.614.

If the library includes all the sets for detection of mutations of an appearance frequency rank not lower than the 40th place, which are represented by these 6 sets, it can be expected to enable detection of at least 50% of the TP53 mutations.

The library preferably includes any one set, preferably any two sets, among the following 3 sets, more preferably all the following 3 sets, in addition to the aforementioned 6 sets:
- at least one oligonucleotide consisting of any of the sequences of SEQ ID NOS: 25 to 28 for detecting a mutation at c.499,
- at least one oligonucleotide consisting of any of the sequences of SEQ ID NOS: 29 to 32 for detecting a mutation at c.298, and
- at least one oligonucleotide consisting of any of the sequences of SEQ ID NOS: 33 to 36 for detecting a mutation at c.809.

If the library includes all the sets for detection of mutations of an appearance frequency rank not lower than the 232nd place, which are represented by these 9 sets, it can be expected to enable detection of at least 80% of the TP53 mutations.

Each of the aforementioned 9 sets is useful by itself as a set of probe and primer for detecting a certain mutation. A certain oligonucleotide included in any of the aforementioned 9 sets and consisting of a specific sequence (probe or primer) is useful by itself. The appearance frequency ranks of the mutations as the object of the detection with the oligonucleotides are not lower than the 10th place, not lower than the 40th place, or not lower than the 232nd place. All the oligonucleotides for detection of a mutation of an appearance frequency rank not lower than the 10th place are useful for detection of at least 30% of the TP53 mutations. All the oligonucleotides for detection of a mutation of an appearance frequency rank not lower than the 40th place are useful for detection of at least 50% of the TP53 mutations. All the oligonucleotides for detection of a mutation of an appearance frequency rank not lower than the 232nd place are useful for detection of at least 80% of the TP53 mutations.

Each of the nucleotides contained in the sequences may be a modified nucleotide. Examples of the modified nucleotide will be mentioned later.

Figure 2:
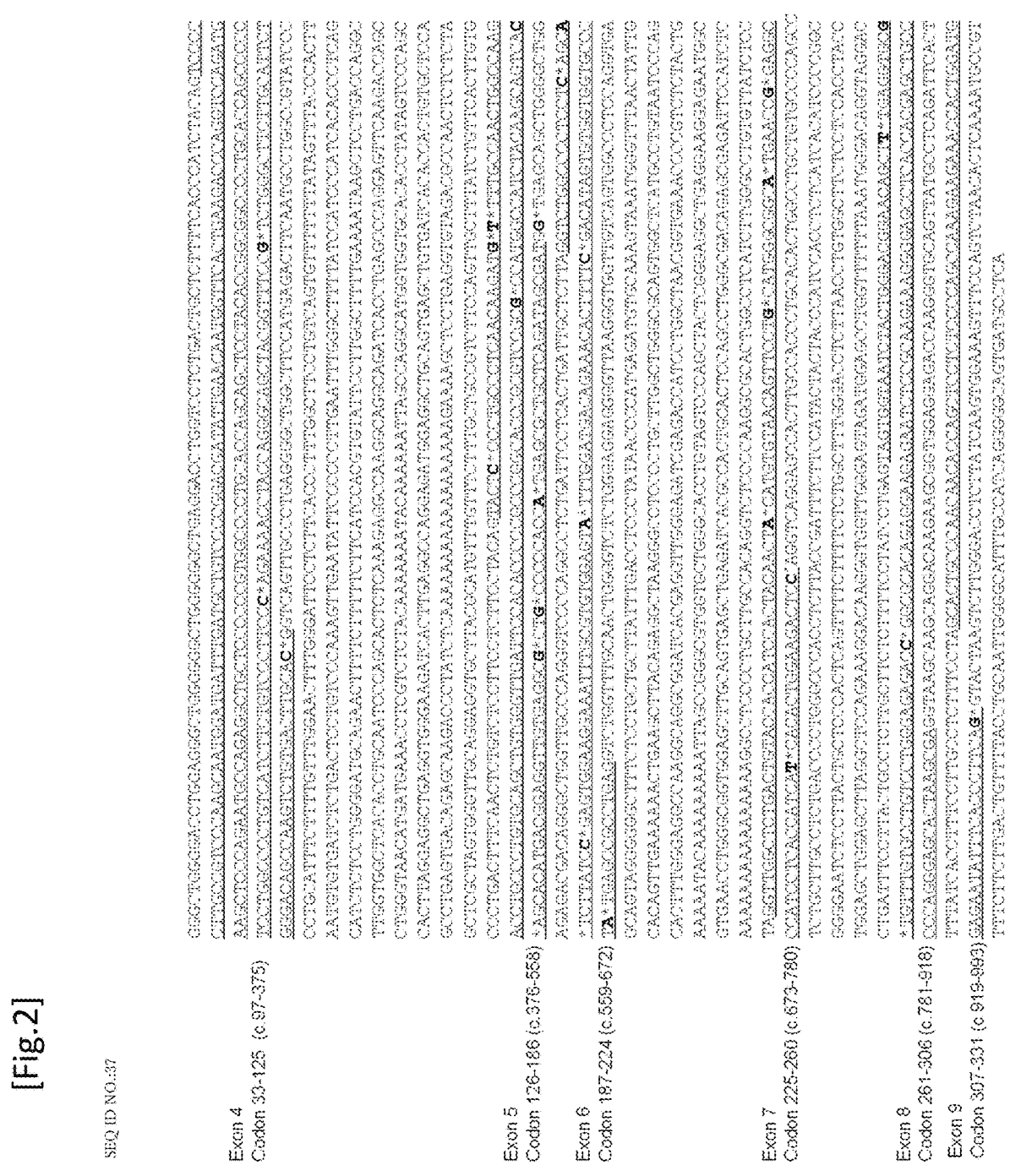

Specific positions and types of the mutations, and nucleotide sequences of the probes and primers are also shown in the tables mentioned in the section of Examples of this specification, FIG. 2, and Sequence Listing.

The probes and/or primers or primer pairs included in the library can be designed on the basis of sequence information obtained from a primary tumor sample of a cancer patient. Many of patients as test subjects for detection of a highly sensitive tumor marker such as ctDNAs mentioned later are in an advanced stage of cancer, and primary care for them is a surgical operation. Therefore, it is comparatively easy to obtain the sequence information using a solid material obtained by the operation.

Although the probes and/or primers or primer pairs included in the library can be variously designed so that they enable analysis of mutations in nucleic acids contained in a sample extracted from a test subject, they are preferably designed so that they enable analysis of ctDNAs existing in blood of a test subject in free forms. This is because, if ctDNAs in blood can be analyzed, mutant DNA characteristic to a tumor can be systemically traced.

That is also because such analysis can be easily performed for a long period of time with less burdens on the patient after the treatment, and can be expected to enable quick transfer to secondary treatment based on quick monitoring of increase in "tumor burden" after the treatment. The analysis includes detection, quantification, and so forth. The test subject may be a cancer patient, a person suspected to have a cancer, or the like.

From the viewpoint of analysis of ctDNAs of test subject, the probes and/or primers or primer pairs included in the library are designed so that they can be used in a method with which a mutant (also referred to as mutant sequence) of a small ratio can be analyzed in the presence of a large excess amount of wild type (also referred to as non-mutated sequence or reference sequence). This is because, in the cancer diagnoses, blood concentration of ctDNA (existence ratio of mutated sequence relative to non-mutated sequence, also referred to as allele frequency) is 1% or lower in many cases, and therefore it is desirable that highly sensitive analysis can be conducted. An example of such a highly sensitive analysis method is dPCR.

dPCR (Vogelstein and Kinzler, Proc. Natl. Acad. USA, 96, 9236-9241, 1999) is a developed form of the conventional PCR method, and it enables direct quantification of a target nucleic acid. dPCR used in combination with a concentration procedure is suitable for detecting an extremely small amount of mutations. Since a DNA sample is diluted even to a single molecule level in dPCR, the starting material should be either a wild type or mutant in each PCR. The concentration is carried out from a single molecule, and thousands of concentration reactions are simultaneously performed in parallel. A large number of PCRs are performed from the same starting material, and then mutated molecules are isolated and detected. By performing quantification for chambers containing the final product of PCR after the PCR amplification, absolute quantity of the nucleic acid can be calculated. Various dPCR-based systems usable for the present invention are marketed. The fundamental methodology of dPCR is described in, for example, Sykes et al., Biotechniques, 13(3):444-449, 1992.

From the viewpoint of analysis of ctDNA, the probes and/or primers or primer pairs are preferably designed so that they enable amplification of a comparatively short nucleic acid fragment as a target sequence, and detection of the target mutation. The size of amplification product in usual PCR is 100 to 150 bp, and reduction of sensitivity and accuracy may cause a problem. It is considered that, in order to improve the analysis performance, it is important to shorten the size of amplification product as much as possible (Antonov J, et al., Lab. Invest., 2005 August; 85(8):1040-50; Kong H, et al., Sci. Rep., 2014 Nov. 28; 4:7246; and Florent Mouliere et al., PLOS ONE, September 2011, Volume 6, Issue 9, e23418). For example, there have been developed methods for conducting the analysis with a comparatively short amplification product, for example, an amplification product of 70 bp or shorter, by the means of inclusion of a modified nucleotide in oligonucleotides as primers or probes, or the like. Primers and probes for such methods are known as Hypercool Primer & Probe™ (Nihon Gene Research Laboratories, Inc., 1-5-2, Nakano, Miyagino-ku, Sendai-shi, Japan), and a method for designing them is publicized. As for detection of mutated sequences of a low ratio in the presence of a large excessive amount of non-mutated sequence, for example, Japanese Patent Unexamined Publication (KOHYO) No. 2010-535031 can be referred to. This technique is based on a treatment protocol performed at a temperature lower than the critical denaturation temperature or melting temperature Tm of non-mutated sequence.

According to one of the preferred embodiments, the oligonucleotides included in the library contain a modified nucleotide (also referred to as modified base). Examples of such a modified nucleotide include a diaminopurine analogue (for example, 2'-O-methyl-2,6-diaminopurine), uracil, peptide nucleic acid analogue, biotin-modified analogue, fluorophore-modified analogue, inosine, 7-deazaguanine, 2'-deoxy-2'-fluoro-β-D-arabinonucleic acid (2'F-ANA) nucleotide, locked nucleic acid (LNA), 2'-O,4'-C-ethylene crosslinked nucleic acid (ENA), and so forth. These modifications can increase the difference between Tms of matched or mismatched bases, and enable highly precise analysis.

The locked nucleic acids mean a class of stereostructurally restricted nucleotide analogues (refer to, for example, WO99/14226; Koshkin, A. A., et al., Tetrahedron (1998), 54:3607-3630; and Obika, S. et al., Tetrahedron Lett. (1998), 39:5401-5404). Introduction of a locked nucleic acid into an oligonucleotide improves compatibility of complement sequence, and increases melting temperature by several stages (Braasch, D. A. and D. R. Corey, Chem. Biol. (2001), 8:1-7).

Particularly preferred examples of the modified nucleotide are 2-amino-dA (2aA) and 5-methyl-dC (5mC), specifically $X_1$ indicates modified nucleotides that are 5-methyl-dC and $X_2$ indicates modified nucleotides 2-amino-dA.

The oligonucleotides included in the library can contain mismatched bases or unmatched bases. Those skilled in the art of nucleic acids can determine stability of a double strand in consideration of many variables such as length of oligonucleotide, base composition and sequence of oligonucleotide, ionic strength, and content of mismatch bases. The stability of nucleic acid double strand is represented by the melting temperature (also referred to as denaturation temperature) Tm.

The probes included in the library may be modified around the ends thereof so that analysis becomes easy. A fluorescent substance can be used for the modification. Examples of the fluorescent substance include 6FAM (also referred to simply as FAM), HEX, Tide Fluor™ 1, ATTO 390, ATTO 425, LC (registered trademark) 480Cyan500, ATTO 465, ATTO 488, Tide Fluor™ 2, ATTO 495, ATTO 514, ATTO 520, TET, JOE, CAL Fluor 540, Yakima Yellow, ATTO 532, ATTO Rho6G, LC (registered trademark) Yellow555, CAL Fluor 560, ATTO 542, Quasar (registered trademark) 570, Cy3, ATTO 550, TAMRA, Tide Fluor™ 3, ATTO 565, ATTO Rho3B, ROX, ATTO Rho11, ATTO Rho12, Cy3.5, ATTO Thio12, ATTO Rho101, LC (registered trademark) Red610, CAL Fluor 610, Tide Fluor™ 4, ATTO 590, TexasRed (SR101), ATTO 594, ATTO Rho13, ATTO 610, LC (registered trademark) Red670, ATTO 620, LC (registered trademark) Red640, ATTO Rho14, ATTO 633, ATTO 647, ATTO 647N, Quasar (registered trademark) 670, Tide Fluor™ 5, Cy5, ATTO 655, ATTO Oxa12, ATTO 665, Tide Fluor™ 6, Cy5.5, ATTO 680, LC (registered trademark) Red705, Quasar (registered trademark) 705, ATTO 700, ATTO 725, ATTO740, Tide Fluor™ 7, and Tide Fluor™ 8. Use of different fluorescent substances for a probe for wild type and probe for mutant enables simultaneous analysis of them.

The probes included in the library may also be modified with a quenching substance (also referred to as quencher). Examples of the quenching substance include Dabcyl, BHQ-0 (registered trademark), BHQ-1 (registered trademark), BHQ-2 (registered trademark), BHQ-3 (registered trademark), TQ™1, TQ™2, TQ™3, TQ™4, TQ™ S, TQ™6, TQ™7 TAMRA, ATTO540Q, ATTO 575Q, ATTO 580Q, ATTO 612Q, and BBQ-650 (registered trademark).

dPCR using the aforementioned primers and probes can be carried out in the same scale as that of the conventional dPCR method. Although amounts of nucleic acids, primers and probes in a sample to be used can be appropriately determined by those skilled in the art, for example, the nucleic acids, primers, and probes can be used in an amount in the range of 0.5 to 50 ng, 0.02 to 2.0 µM, and 0.01 to 1.0 µM, respectively, per one chip of dPCR. The composition of the system can contain, besides the nucleic acids, primers, and probes, four kinds of dNTPs, buffering agent, salt, surfactant, and enzymes that catalyze the chain extension reaction, as apparent to those skilled in the art.

[Use of Library]

The library of the present invention can be used in a method of assisting prediction of relapse or prognosis of a cancer in a test subject after a treatment of the cancer. The method of assisting refers to a method conducted by a person other than medical practitioners, for example, clinical laboratory technologist, nurse, public health nurse, test subject himself or herself, etc. Such a method specifically comprises the step of preparing at least one kind of probe and/or primer or primer pair from the library of the present invention prepared beforehand, and analyzing a mutation in a nucleic acid obtained from a test subject by using the prepared probe and/or primer or primer pair. To the library that can be used for such a method, all the explanations for the library already described in this specification are applied.

It is considered that the method provided by the present invention is effective for all kinds of cancers including alimentary canal cancers such as esophageal cancer, gastric cancer, and colorectal cancer.

According to a preferred embodiment, the method of the present invention can be performed as follows.

A set considered to be appropriate (for example, a set of primer and probe for analyzing a case-specific mutation detected in mutation analysis of primary lesion) is obtained from the library of the present invention prepared beforehand, and after operation thereof is checked by using primary lesion DNA of a test subject as required, ratio of mutated DNA (mutant allele frequency, %) in a sample appropriately extracted from the test subject is monitored. The sample is preferably plasma, and a mutation can be analyzed as ctDNA.

When a test subject with a small amount of tumor cells, for example, a test subject of stage I, is the object, ctDNAs may not be detected before a treatment, after an operation, or in the follow-up period. In a test subject with a certain amount of tumor cells, for example, a test subject of stage II, reduction of ctDNAs detected before a treatment to 0% can be confirmed after an operation. Further, by analyzing presence or absence or amount of ctDNAs in the follow-up including postoperative adjuvant chemotherapy, relapse can be predicted. According to the method of the present invention, reduction of ctDNAs accompanying shrinkage of tumor caused by chemotherapy or radiotherapy can be confirmed in some test subjects. According to the method of the present invention, relapse may be diagnosed at an earlier stage compared with the conventional CT diagnosis.

Analysis of ctDNA is also advantageous in the point that it is considered to realize systemic monitoring of mutated DNAs characteristic to a tumor. Moreover, it makes it easy to perform analysis over a long period of time after a treatment with less burden on patients, and it is expected to enable quick transfer to secondary treatment based on quick monitoring of increase in "tumor burden" after the treatment.

The library of the present invention makes it unnecessary to design and synthesize primers and probes for each test subject for detecting ctDNAs. By using the library of the present invention including highly versatile primers and probes, or primers and probes designed so as to enable non-intermittent detection of mutations, relapse of cancer after a treatment can be diagnosed at an early stage. It also enables it to easily perform individualized post-treatment follow-up of cancer patients.

The library of the present invention can also be used in methods for early detection or diagnosis of cancers.

The present invention will be further precisely explained below with reference to examples. However, the present invention is no way limited by these examples.

Examples

[Creation of Library]

Typical examples of sets of primers and probes, which were synthesized by using Hypercool Primer & Probe, and of which operation was confirmed, are shown in the following tables. The synthesis was entrusted to Nihon Gene Research Laboratories, Inc. (1-5-2, Nakano, Miyagino-ku, Sendai-shi, Japan). In the nucleotide sequences indicated in the tables, the boxed portions are Tm-increasing nucleotide insertion positions (modified nucleotide positions), and the symbols * indicate mutation positions.

TP53 Primer/Probe Sequence

Examples of primers and probes for TP53 point mutations of an appearance ratio included in top 10, 40 or 232 higher appearance ratios among 1,284 kinds of such mutations (total 25,376 mutations) for all the cancers, and ratios of theoretically detectable TP53 mutations

TABLE 2-1

Those for mutations of appearance ratio included in top 10 higher appearance ratios (enabling detection of 30% of TP53 mutations)

| chr17:7577094 c.844C>T (p.Arg282Trp) | Sequence (5'->3') | Strand | Length | SEQ ID NO |
|---|---|---|---|---|
| Forward primer | GGGACGGAACAGCTTTGAG | Plus | 19 | 1 |
| Reverse primer | CCCCTTTCTTGX$_1$GGAGATTC | Minus | 20 | 2 |
| Probe Wt | HEX-CCTXTGTGCGCCG*GTCT-BHQ | Minus | 17 | 3 |
| Probe Mt | FAM-TCCTX$_1$TGTGCGCX$_1$X$_2$*GTCT-BHQ | Minus | 18 | 4 |
| Product length | — | — | 86 | |

| chr17:7578212 c.637C>T (p.Arg213Ter) | Sequence (5'->3') | Strand | Length | SEQ ID NO |
|---|---|---|---|---|
| Forward primer | TGTGGAGTATTTGGATGACAGA | Plus | 22 | 5 |
| Reverse primer | AGTIGCAAACCAGACCTCA | Minus | 19 | 6 |
| Probe Wt | HEX-ACCACCACAX$_1$TX$_2$TGTX$_1$G*X$_2$X$_2$AAG-BHQ | Minus | 22 | 7 |
| Probe Mt | FAM-ACCACCAX$_1$X$_2$X$_1$TX$_2$TGTX$_1$A*X$_2$X$_2$AAG-BHQ | Minus | 22 | 8 |
| Product length | — | — | 82 | |

TABLE 2-1-continued

Those for mutations of appearance ratio included in top 10 higher appearance ratios (enabling detection of 30% of TP53 mutations)

| chr17:7578190 c.659A>G (p.Tyr220Cys) | Sequence (5'->3') | Strand | Length | SEQ ID NO |
|---|---|---|---|---|
| Forward primer | TGTGGAGTATTTGGATGACAGA | Plus | 22 | 9 |
| Reverse primer | AGTTGCAAACCAGACCTCAG | Minus | 20 | 10 |
| Probe Wt | HEX-TGGTG $X_1$C $X_1$TA*TG $X_2$GCCG-BHQ | Plus | 17 | 11 |
| Probe Mt | FAM-TGGTG $X_1$C $X_1$TG*TG $X_2$GCC-BHQ | Plus | 16 | 12 |

TABLE 2-2

Those for mutations of appearance ratio included in top 40 higher appearance ratios (enabling detection of 50% of TP53 mutations)

| chr17:7578403 c.527G>A (p.Cys176Tyr) | Sequence (5'->3') | Strand | Length | SEQ ID NO |
|---|---|---|---|---|
| Forward primer | GTCA$X_1X_2$GCACATGACGGA | Plus | 18 | 13 |
| Reverse primer | CACC$X_2$T $X_1$GCTAT $X_1$TGAGCA | Minus | 19 | 14 |
| Probe Wt | HEX-TTGTG$X_2$GGCG $X_1$TG*CCCC-BHQ | Plus | 17 | 15 |
| Probe Mt | FAM-TTGTG$X_2$GGCG $X_1$TA*CCCCC-BHQ | Plus | 18 | 16 |
| Product length | — | — | 68 | |

| chr17:7577556 c.725G>T (p.Cys242Phe) | Sequence (5'->3') | Strand | Length | SEQ ID NO |
|---|---|---|---|---|
| Forward primer | GTTGGCTCTGACTGTACCAC | Plus | 20 | 17 |
| Reverse primer | CCAGTGTGATGATGGTGAGG | Minus | 20 | 18 |
| Probe Wt | HEX-TGTAACAGTT$X_1X_1$TG*$X_1X_2$TGGGC-BHQ | Plus | 21 | 19 |
| Probe Mt | FAM-TGT$X_2$A$X_1X_2$GTT$X_1X_1$TT*$X_1X_2$TGGGC-BHQ | Plus | 21 | 20 |
| Product length | — | — | 100 | |

| chr:17:7578235 c.614A>G (p.Tyr205Cys) | Sequence(5'->3') | Strand | Length | SEQ ID NO |
|---|---|---|---|---|
| Forward primer | AGTGGAAGGAAATTTGCGTG | Plus | 20 | 21 |
| Reverse primer | ACCACCACACTATGTCGAAAG | Minus | 22 | 22 |
| Probe Wt | HEX-TGG$X_2$GTA*TTTGG$X_2$TG$X_2X_1X_2$G$X_2$AACA-BHQ | Plus | 24 | 23 |
| Probe Mt | FAM-TGG$X_2$GTG*TTTGG$X_2$TG$X_2$C$X_2$G$X_2$AAC-BHQ | Plus | 23 | 24 |
| Product length | — | — | 66 | |

TABLE 2-3

Those for mutations of appearance ratio included in top 232 higher appearance ratios (enabling detection of 80% of TP53 mutations)

| chr17:7578431 c.499C>T (p.Gln167Ter) | Sequence (5'->3') | Strand | Length | SEQ ID NO |
|---|---|---|---|---|
| Forward primer | CCATGGCCATCTACAAGCA | Plus | 19 | 25 |
| Reverse primer | CTCACCATCGCTATCTGAGCA | Minus | 21 | 26 |
| Probe Wt | HEX-CCT $X_1$ $X_1$GTC $X_2$TGTG $X_1$TG*TGA-BHQ | Minus | 19 | 27 |
| Probe Mt | FAM-ACCT $X_1$ $X_1$GT $X_1$ $X_2$TGTG $X_1$TA*TGA-BHQ | Minus | 20 | 28 |
| Product length | — | — | 89 | |
| chr17:7579389 c.298C>T (p.Gln100Ter) | Sequence (5'->3') | Strand | Length | SEQ ID NO |
| Forward primer | GCCCCTGTCATCTTCTGTCC | Plus | 20 | 29 |
| Reverse primer | CCAGAATGCAAGAAGCCCAG | Minus | 20 | 30 |
| Probe Wt | HEX-CCCTGGT$X_2$GGTTTT $X_1$TG*GGAAG-BHQ | Minus | 22 | 31 |
| Probe Mt | FAM-TGCCCTGGTAGGTTTTCT$X_2$*GGAAG-BHQ | Minus | 24 | 32 |
| Product length | — | — | 78 | |
| chr17:7577129 c.809T>G (p.Phe270Cys) | Sequence(5'->3') | Strand | Length | SEQ ID NO |
| Forward primer | TCCTGAGTAGTGGT$X_2$$X_2$TCTACTG | Plus | 23 | 33 |
| Reverse primer | CCCAGGACAGGCACAAAC | Minus | 18 | 34 |
| Probe Wt | HEX-ACCT$X_1$X2A*$X_2$GCTGTTCCGTCC-BHQ | Minus | 20 | 35 |
| Probe Mt | FAM-CCT$X_1$AC*AGCTGTTC$X_1$GTCC-BHQ | Minus | 19 | 36 |
| Product length | — | — | 65 | |

[Operation Check of Primer/Probe]

By using primary lesion (or sufficient amount of plasma) DNAs, operation check of 29 sets of primers/probes designed and synthesized for each case-specific mutation was performed. The operation check was performed by using QuantStudio 3D Digital PCR System (Thermo Fisher Scientific). With all the sets, mutated alleles (blue) and wild type alleles (red) were separated (FIG. 3).

[Monitoring of Mutant DNA in Circulating Plasma (Circulating Tumor DNA) Using Case-Specific TP53 Mutation Probe]

DNAs were extracted from esophageal cancer primary lesion tissues obtained before treatment, and screening for genetic mutations was performed by using peripheral blood monocyte DNAs as the normal control. For the detected genetic mutations, digital PCR probes that separately label wild type allele (normal allele) and mutant allele (mutated allele) and primers for amplifying regions including mutation site were designed and synthesized (Hypercool™ Technology, Nihon Gene Research Laboratories, Inc., was used).

Patient blood samples were extracted before treatment, after treatment such as chemotherapy, surgical operation, and radiotherapy, and during follow-up period after the treatment, plasma was separated from each sample by centrifugation, and free DNAs in the plasma were extracted. The plasma DNAs were extracted by using QIAamp (registered trademark) Circulating Nucleic Acid Kit (QIAGEN). Since most of free plasma DNAs are wild type DNAs derived from normal cells, mutant DNAs derived from cancer cells usually account for 1% or less, and are not detected in many cases. Therefore, operation check of the synthesized primers/probes was performed by digital PCR using DNAs of primary lesions. After it was confirmed that wild type alleles and mutant alleles were separated and measurable, analysis was performed with the plasma samples. The analysis was performed according to the protocol of QuantStudio 3D Digital PCR System (Thermo Fisher Scientific) using a PCR reaction mixture adjusted to contain 900 nM of primers and 250 nM of probe as final concentrations, and 1 to 20 ng of DNAs for one chip.

A flowchart of the ctDNA monitoring experiment is shown as FIG. 4. For the case-specific mutations detected in the mutation analysis of the primary lesion, probes that separately fluorescence-label wild type DNAs and mutant DNAs were prepared (HEX for wild type, and FAM for mutant), operation check thereof was performed by using primary lesion DNAs, and then ratio of mutant DNAs (mutant allele frequency (%)) in the plasma sample collected during the treatment process was measured. As shown in the example, reduction of mutant DNAs (blue) was observed after the treatment ((2) and (3)) compared with the mutant DNAs observed before the treatment ((1)).

[Monitoring of TP53 Mutant DNAs in Plasmas of Esophageal Cancer Cases at Stages I to IV]

In the stage I case with a small amount of tumor cells, ctDNA was not detected before the treatment, after the operation, and during the follow-up period. In the stage II case, ctDNAs detected before the treatment decreased to 0% after the operation, and ctDNA was not detected during the follow-up including postoperative adjuvant chemotherapy. In these cases, relapse was not observed until the present. In the stage III case, although decrease of ctDNAs was observed accompanying shrinkage of tumor caused by chemotherapy or radiotherapy, ctDNAs increased with re-increase of the tumor, and the patient died within a short period of time after the end of the follow-up (FIG. 5). MAF stands for mutant allele frequency; CF for cisplatin/5-FU; DCF for docetaxel/cisplatin/5-FU; CRT for chemoradiotherapy; and PTX for paclitaxel.

[Monitoring of ctDNA in Stage IIA Esophageal Cancer]

In mutation analysis of a primary lesion performed before the treatment, a TP53 mutation, p.Tyr220Cys (c.659A>G), was detected. A set of primer/probe for this mutation was synthesized, and ctDNAs were detected in a plasma sample collected during the treatment process. Decrease of ctDNA amount (MAF) was observed with preoperative chemotherapy (CF, cisplatin/5-FU). After one and a half years from the operation (day 615), relapse was confirmed at mediastinal lymph node, but by CT inspection, lymph node suspected of relapse was not detected six months before (day 436), and only 3-mm lymph node was observed even three months before (day 527), which did not lead relapse diagnosis. Increase of ctDNA was observed from the day 438, and thus the ctDNA analysis may enable earlier relapse diagnosis compared with CT diagnosis. After a chemoradiotherapy was performed for a relapse lesion, complete response (full effectiveness) was obtained, and ctDNA detection also became negative (0%) (FIG. 6). MAF stands for mutant allele frequency; CF for cisplatin/5-FU; and CRT for chemoradiotherapy.

Sequence Listing Free Text
SEQ ID NOS: 1 to 36, sequences of primers or probes for dPCR
SEQ ID NO: 37, sequence of DNA binding domain of TP53 gene

The invention claimed is:

1. A method for analyzing genetic mutation relevant to a cancer in the region encoding the DNA binding domain of the TP53 gene in a test subject, the method comprising the following (1) to (3):
(1) preparing a library constituted by a plurality of probes and/or primers or primer pairs, wherein the plurality of probes and or primer pairs include those for detecting mutations of 524G>A, 743G>A, 818G>A, 817C>T, 742C>T, 844C>T, 637C>T, 733G>A, 747G>T, and 659A>G;
(2) selecting a probe and/or primer or primer pair for detecting one mutation from the prepared library; and
(3) analyzing a mutation in a circulating tumor DNA obtained from blood of the test subject by digital PCR using the selected probe and primer pair,
wherein the library comprises
a primer pair consisting of the sequences of SEQ ID NOS: 9 and 10, and
a probe pair of oligonucleotides consisting of the sequences of

TGGTCCCTA*TGAGCCG (SEQ ID NO: 11)

TGGTCCCTG*TGAGCC, (SEQ ID NO: 12)

each of which may be a labeled product thereof;
in the sequences, the boxes indicate modified nucleotides that are 5-methyl-dC or 2-amino-dA, and the symbols * indicate nucleotides corresponding to a position of mutation.

2. The method according to claim 1, wherein the plurality of probes and primer pairs further include those for detecting 586C>T, 469G>T, 536A>G, 488A>G, 527G>T, 818G>T, 853G>A, 734G>A, 722C>T, 578A>G, 535C>T, 856G>A, 584T>C, 574C>T, 701A>G, 814G>A, 711G>A, 713G>A, 743G>T, 473G>A, 646G>A, 832C>T, 422G>A, 527G>A, 455C>T, 473G>T, 725G>T, 833C>T, 614A>G, and 641A>G.

3. The method according to claim 1, wherein the plurality of probes and primer pairs further include those for detecting 734G>T, 451C>T, 797G>A, 839G>A, 839G>C, 707A>G, 733G>T, 517G>T, 404G>A, 581T>G, 796G>A, 517G>A, 380C>T, 395A>G, 824G>A, 404G>T, 730G>T, 577C>T, 638G>T, 749C>T, 772G>A, 578A>T, 824G>T, 736A>G, 797G>T, 476C>T, 725G>A, 461G>T, 481G>A, 731G>A, 638G>A, 713G>T, 715A>G, 406C>T, 493C>T, 536A>T, 811G>A, 437G>A, 438G>A, 592G>T, 430C>T, 711G>T, 730G>A, 746G>T, 610G>T, 722C>G, 329G>T, 745A>T, 814G>T, 841G>C, 396G>T, 836G>A, 838A>G, 799C>T, 830G>T, 583A>T, 832C>A, 844C>G, 452C>A, 548C>G, 569C>T, 833C>G, 396G>C, 475G>C, 499C>T, 427G>A, 644G>T, 775G>T, 700T>C, 716A>G, 745A>G, 841G>A, 298C>T, 310C>T, 820G>T, 763A>T, 821T>C, 464C>A, 467G>C, 542G>A, 580C>T, 746G>C, 818G>C, 845G>A, 772G>T, 405C>G, 541C>T, 832C>G, 856G>T, 329G>C, 413C>T, 514G>T, 584T>A, 511G>T, 811G>T, 375G>T, 523C>G, 747G>C, 394A>G, 487T>A, 800G>C, 853G>T, 738G>A, 742C>G, 785G>T, 859G>T, 375G>A, 454C>T, 487T>C, 524G>T, 725G>C, 794T>C, 839G>T, 848G>C, 388C>G, 528C>G, 535C>A, 596G>T, 643A>G, 722C>A, 796G>T, 374C>T, 377A>G, 517G>C, 523C>T, 530C>T, 817C>A, 434T>A, 463A>C, 503A>G, 535C>G, 658T>A, 700T>A, 743G>C, 843C>G, 380C>A, 400T>C, 412G>C, 421T>C, 472C>T, 473G>C, 587G>C, 706T>A, 526T>A, 526T>C, 537T>A, 542G>C, 659A>C, 731G>T, 733G>C, 843C>A, 845G>C, 857A>G, 661G>T, 434T>C, 451C>G, 490A>G, 613T>G, 718A>G, 808T>C, 809T>C, 313G>T, 388C>T, 559G>A, 623A>T, 645T>G, 658T>C, 796G>C, 809T>G, 823T>C, 840A>T, 841G>T, 847C>T, 854A>T, 328C>T, 423C>G, 451C>A, 472C>G, 518T>C, 596G>A, 755T>C, 830G>A, 833C>A, 842A>G, 497C>G, 395A>T, 470T>G, 530C>G, 578A>C, 632C>T, 712T>C, and 746G>A.

4. The method according to claim 1, wherein the probes and primer pairs include an oligonucleotide consisting of any one of the sequences of SEQ ID NOS: 1 to 116 or a labeled product thereof.

5. The method according to claim 1, wherein the cancer is esophageal cancer, gastric cancer, or colorectal cancer.

6. The method according to claim 1, further comprising obtaining blood from the test subject after treatment and analyzing for the selected mutation identified in the primary lesion before treatment.

7. The method according to claim 1, wherein the library comprises the following (1), (2), and (4) to (9):
(1) a primer pair consisting of the sequences of SEQ ID NOS: 1 and 2, and a probe pair of oligonucleotides consisting of the sequences of

CCT[C]TGTGCGCCG*GTCT (SEQ ID NO: 3)

TCCT[C]TGTGCGC[CA]*GTCT, (SEQ ID NO: 4)

each of which may be a labeled product thereof,
(2) a primer pair consisting of the sequences of SEQ ID NOS: 5 and 6, and a probe pair of oligonucleotides consisting of the sequences of

ACCACCACA[C][A]TGT[C]G*[AA]AAG (SEQ ID NO: 7)

ACCACCA[CA][C][A]TGT[C]A*[AA]AAG, (SEQ ID NO: 8)

each of which may be a labeled product thereof,
(4) a primer pair consisting of the sequences of SEQ ID NOS: 13 and 14, and a probe pair of oligonucleotides consisting of the sequences of

TTGTG[A]GGCG[C]TG*CCCC (SEQ ID NO: 15)

TTGTG[A]GGCG[C]TA*CCCCC, (SEQ ID NO: 16)

each of which may be a labeled product thereof,
(5) a primer pair consisting of the sequences of SEQ ID NOS: 17 and 18, and a probe pair of oligonucleotides consisting of the sequences of

TGTAACAGTT[CC]TG*[CA]TGGGC (SEQ ID NO: 19)

TGT[AA][CA]GTT[CC]TT*[CA]TGGGC, (SEQ ID NO: 20)

each of which may be a labeled product thereof,
(6) a primer pair consisting of the sequences of SEQ ID NOS: 21 and 22, and a probe pair of oligonucleotides consisting of the sequences of

TGG[A]GTA*TTTGG[A]TG[ACA]G[A]AACA (SEQ ID NO: 23)

TGG[A]GTG*TTTGG[A]TG[A]C[A]G[A]AAC, (SEQ ID NO: 24)

each of which may be a labeled product thereof,
(7) a primer pair consisting of the sequences of SEQ ID NOS: 25 and 26, and a probe pair of oligonucleotides consisting of the sequences of

CCT[CC]GT[CA]TGT[GC]TG*TGA (SEQ ID NO: 27)

ACCT[CC]GT[CA]TGT[GC]TA*TGA (SEQ ID NO: 28)

each of which may be a labeled product thereof,
(8) a primer pair consisting of the sequences of SEQ ID NOS: 29 and 30, and a probe pair of oligonucleotides consisting of the sequences of

CCCTGGT[A]GGTTTT[C]TG*GGAAG (SEQ ID NO: 31)

TGCCCTGGTAGGTTTTCT[A]*GGAAG (SEQ ID NO: 32)

each of which may be a labeled product thereof, and
(9) a primer pair consisting of the sequences of SEQ ID NOS: 33 and 34, and a probe pair of oligonucleotides consisting of the sequences of

ACCT[CA]A*[A]GCTGTTCCGTCC (SEQ ID NO: 35)

CCT[C]AC*AGCTGTT[CC]GTCC (SEQ ID NO: 36)

each of which may be a labeled product thereof;
in the sequences, the boxes indicate modified nucleotides that are 5-methyl-dC or 2-amino-dA, and the symbols * indicate nucleotides corresponding to a position of mutation.

* * * * *

SEQUENCE LISTING

```
<160> NUMBER OF SEQ ID NOS: 37

<210> SEQ ID NO 1
<211> LENGTH: 19
<212> TYPE: DNA
<213> ORGANISM: Artificial Sequence
<220> FEATURE:
<223> OTHER INFORMATION: Forward primer

<400> SEQUENCE: 1
gggacggaac agctttgag                                                  19

<210> SEQ ID NO 2
<211> LENGTH: 20
<212> TYPE: DNA
<213> ORGANISM: Artificial Sequence
<220> FEATURE:
<223> OTHER INFORMATION: Reverse primer

<400> SEQUENCE: 2
cccctttctt gcggagattc                                                 20

<210> SEQ ID NO 3
<211> LENGTH: 17
<212> TYPE: DNA
<213> ORGANISM: Artificial Sequence
<220> FEATURE:
<223> OTHER INFORMATION: Probe Wt

<400> SEQUENCE: 3
cctctgtgcg ccggtct                                                    17

<210> SEQ ID NO 4
<211> LENGTH: 18
<212> TYPE: DNA
<213> ORGANISM: Artificial Sequence
<220> FEATURE:
<223> OTHER INFORMATION: Probe Mt

<400> SEQUENCE: 4
```

```
tcctctgtgc gccagtct                                                      18

<210> SEQ ID NO 5
<211> LENGTH: 22
<212> TYPE: DNA
<213> ORGANISM: Artificial Sequence
<220> FEATURE:
<223> OTHER INFORMATION: Forward primer

<400> SEQUENCE: 5
tgtggagtat ttggatgaca ga                                                 22

<210> SEQ ID NO 6
<211> LENGTH: 19
<212> TYPE: DNA
<213> ORGANISM: Artificial Sequence
<220> FEATURE:
<223> OTHER INFORMATION: Reverse primer

<400> SEQUENCE: 6
agttgcaaac cagacctca                                                     19

<210> SEQ ID NO 7
<211> LENGTH: 22
<212> TYPE: DNA
<213> ORGANISM: Artificial Sequence
<220> FEATURE:
<223> OTHER INFORMATION: Probe Wt

<400> SEQUENCE: 7
accaccacac tatgtcgaaa ag                                                 22

<210> SEQ ID NO 8
<211> LENGTH: 22
<212> TYPE: DNA
<213> ORGANISM: Artificial Sequence
<220> FEATURE:
<223> OTHER INFORMATION: Probe Mt

<400> SEQUENCE: 8
accaccacac tatgtcaaaa ag                                                 22

<210> SEQ ID NO 9
<211> LENGTH: 22
<212> TYPE: DNA
<213> ORGANISM: Artificial Sequence
<220> FEATURE:
<223> OTHER INFORMATION: Forward primer

<400> SEQUENCE: 9
tgtggagtat ttggatgaca ga                                                 22

<210> SEQ ID NO 10
<211> LENGTH: 20
<212> TYPE: DNA
<213> ORGANISM: Artificial Sequence
<220> FEATURE:
<223> OTHER INFORMATION: Reverse primer

<400> SEQUENCE: 10
agttgcaaac cagacctcag                                                    20

<210> SEQ ID NO 11
<211> LENGTH: 17
<212> TYPE: DNA
<213> ORGANISM: Artificial Sequence
```

```
<220> FEATURE:
<223> OTHER INFORMATION: Probe Wt

<400> SEQUENCE: 11
tggtgcccta tgagccg                                                17

<210> SEQ ID NO 12
<211> LENGTH: 16
<212> TYPE: DNA
<213> ORGANISM: Artificial Sequence
<220> FEATURE:
<223> OTHER INFORMATION: Probe Mt

<400> SEQUENCE: 12
tggtgccctg tgagcc                                                 16

<210> SEQ ID NO 13
<211> LENGTH: 18
<212> TYPE: DNA
<213> ORGANISM: Artificial Sequence
<220> FEATURE:
<223> OTHER INFORMATION: Forward primer

<400> SEQUENCE: 13
gtcacagcac atgacgga                                               18

<210> SEQ ID NO 14
<211> LENGTH: 19
<212> TYPE: DNA
<213> ORGANISM: Artificial Sequence
<220> FEATURE:
<223> OTHER INFORMATION: Reverse primer

<400> SEQUENCE: 14
caccatcgct atctgagca                                              19

<210> SEQ ID NO 15
<211> LENGTH: 17
<212> TYPE: DNA
<213> ORGANISM: Artificial Sequence
<220> FEATURE:
<223> OTHER INFORMATION: Probe Wt

<400> SEQUENCE: 15
ttgtgaggcg ctgcccc                                                17

<210> SEQ ID NO 16
<211> LENGTH: 18
<212> TYPE: DNA
<213> ORGANISM: Artificial Sequence
<220> FEATURE:
<223> OTHER INFORMATION: Probe Mt

<400> SEQUENCE: 16
ttgtgaggcg ctacccccc                                              18

<210> SEQ ID NO 17
<211> LENGTH: 20
<212> TYPE: DNA
<213> ORGANISM: Artificial Sequence
<220> FEATURE:
<223> OTHER INFORMATION: Forward primer

<400> SEQUENCE: 17
gttggctctg actgtaccac                                             20
```

```
<210> SEQ ID NO 18
<211> LENGTH: 20
<212> TYPE: DNA
<213> ORGANISM: Artificial Sequence
<220> FEATURE:
<223> OTHER INFORMATION: Reverse primer

<400> SEQUENCE: 18
ccagtgtgat gatggtgagg                                                   20

<210> SEQ ID NO 19
<211> LENGTH: 21
<212> TYPE: DNA
<213> ORGANISM: Artificial Sequence
<220> FEATURE:
<223> OTHER INFORMATION: Probe Wt

<400> SEQUENCE: 19
tgtaacagtt cctgcatggg c                                                 21

<210> SEQ ID NO 20
<211> LENGTH: 21
<212> TYPE: DNA
<213> ORGANISM: Artificial Sequence
<220> FEATURE:
<223> OTHER INFORMATION: Probe Mt

<400> SEQUENCE: 20
tgtaacagtt ccttcatggg c                                                 21

<210> SEQ ID NO 21
<211> LENGTH: 20
<212> TYPE: DNA
<213> ORGANISM: Artificial Sequence
<220> FEATURE:
<223> OTHER INFORMATION: Forward primer

<400> SEQUENCE: 21
agtggaagga aatttgcgtg                                                   20

<210> SEQ ID NO 22
<211> LENGTH: 22
<212> TYPE: DNA
<213> ORGANISM: Artificial Sequence
<220> FEATURE:
<223> OTHER INFORMATION: Reverse primer

<400> SEQUENCE: 22
accaccacac tatgtcgaaa ag                                                22

<210> SEQ ID NO 23
<211> LENGTH: 24
<212> TYPE: DNA
<213> ORGANISM: Artificial Sequence
<220> FEATURE:
<223> OTHER INFORMATION: Probe Wt

<400> SEQUENCE: 23
tggagtattt ggatgacaga aaca                                              24

<210> SEQ ID NO 24
<211> LENGTH: 23
<212> TYPE: DNA
<213> ORGANISM: Artificial Sequence
<220> FEATURE:
<223> OTHER INFORMATION: Probe Mt
```

```
<400> SEQUENCE: 24
tggagtgttt ggatgacaga aac                                           23

<210> SEQ ID NO 25
<211> LENGTH: 19
<212> TYPE: DNA
<213> ORGANISM: Artificial Sequence
<220> FEATURE:
<223> OTHER INFORMATION: Forward primer

<400> SEQUENCE: 25
ccatggccat ctacaagca                                                19

<210> SEQ ID NO 26
<211> LENGTH: 21
<212> TYPE: DNA
<213> ORGANISM: Artificial Sequence
<220> FEATURE:
<223> OTHER INFORMATION: Reverse primer

<400> SEQUENCE: 26
ctcaccatcg ctatctgagc a                                             21

<210> SEQ ID NO 27
<211> LENGTH: 19
<212> TYPE: DNA
<213> ORGANISM: Artificial Sequence
<220> FEATURE:
<223> OTHER INFORMATION: Probe Wt

<400> SEQUENCE: 27
cctccgtcat gtgctgtga                                                19

<210> SEQ ID NO 28
<211> LENGTH: 20
<212> TYPE: DNA
<213> ORGANISM: Artificial Sequence
<220> FEATURE:
<223> OTHER INFORMATION: Probe Mt

<400> SEQUENCE: 28
acctccgtca tgtgctatga                                               20

<210> SEQ ID NO 29
<211> LENGTH: 20
<212> TYPE: DNA
<213> ORGANISM: Artificial Sequence
<220> FEATURE:
<223> OTHER INFORMATION: Forward primer

<400> SEQUENCE: 29 gccctgtca tcttctgtcc                                                20

<210> SEQ ID NO 30
<211> LENGTH: 20
<212> TYPE: DNA
<213> ORGANISM: Artificial Sequence
<220> FEATURE:
<223> OTHER INFORMATION: Reverse primer

<400> SEQUENCE: 30
ccagaatgca agaagcccag                                               20

<210> SEQ ID NO 31
```

```
<211> LENGTH: 22
<212> TYPE: DNA
<213> ORGANISM: Artificial Sequence
<220> FEATURE:
<223> OTHER INFORMATION: Probe Wt

<400> SEQUENCE: 31
ccctggtagg ttttctggga ag                                              22

<210> SEQ ID NO 32
<211> LENGTH: 24
<212> TYPE: DNA
<213> ORGANISM: Artificial Sequence
<220> FEATURE:
<223> OTHER INFORMATION: Probe Mt

<400> SEQUENCE: 32
tgccctggta ggttttctag gaag                                            24

<210> SEQ ID NO 33
<211> LENGTH: 23
<212> TYPE: DNA
<213> ORGANISM: Artificial Sequence
<220> FEATURE:
<223> OTHER INFORMATION: Forward primer

<400> SEQUENCE: 33
tcctgagtag tggtaatcta ctg                                             23

<210> SEQ ID NO 34
<211> LENGTH: 18
<212> TYPE: DNA
<213> ORGANISM: Artificial Sequence
<220> FEATURE:
<223> OTHER INFORMATION: Reverse primer

<400> SEQUENCE: 34
cccaggacag gcacaaac                                                   18

<210> SEQ ID NO 35
<211> LENGTH: 20
<212> TYPE: DNA
<213> ORGANISM: Artificial Sequence
<220> FEATURE:
<223> OTHER INFORMATION: Probe Wt

<400> SEQUENCE: 35
acctcaaagc tgttccgtcc                                                 20

<210> SEQ ID NO 36
<211> LENGTH: 19
<212> TYPE: DNA
<213> ORGANISM: Artificial Sequence
<220> FEATURE:
<223> OTHER INFORMATION: Probe Mt

<400> SEQUENCE: 36
cctcacagct gttccgtcc                                                  19

<210> SEQ ID NO 37
<211> LENGTH: 2940
<212> TYPE: DNA
<213> ORGANISM: Homo sapiens

<400> SEQUENCE: 37
gggctgggga cctggagggc tgggggctg gggggctgag gacctggtcc tctgactgct      60
```

```
cttttcaccc atctacagtc ccccttgccg tcccaagcaa tggatgattt gatgctgtcc    120
ccggacgata ttgaacaatg gttcactgaa gacccaggtc cagatgaagc tcccagaatg    180
ccagaggctg ctcccccgt ggcccctgca ccagcagctc ctacaccggc ggcccctgca    240
ccagccccct cctggcccct gtcatcttct gtcccttccc agaaaaccta ccagggcagc    300
tacggtttcc gtctgggctt cttgcattct gggacagcca agtctgtgac ttgcacggtc    360
agttgccctg aggggctggc ttccatgaga cttcaatgcc tggccgtatc ccctgcatt    420 tcttttgttt ggaactttgg gattcctctt caccctttgg cttcctgtca gtgttttttt    480
atagtttacc cacttaatgt gtgatctctg actcctgtcc caaagttgaa tattcccccc    540
ttgaatttgg gcttttatcc atcccatcac accctcagca tctctcctgg ggatgcagaa    600 ctttctttt tcttcatcca cgtgtattcc ttggcttttg aaaataagct cctgaccagg    660
cttggtggct cacacctgca atcccagcac tctcaaagag gccaaggcag gcagatcacc    720
tgagcccagg agttcaagac cagcctgggt aacatgatga aacctcgtct ctacaaaaaa    780
atacaaaaaa ttagccaggc atggtggtgc acacctatag tcccagccac ttaggaggct    840
gaggtgggaa gatcacttga ggccaggaga tggaggctgc agtgagctgt gatcacacca    900
ctgtgctcca gcctgagtga cagagcaaga ccctatctca aaaaaaaaa aaaaaagaa    960 aagctcctga ggtgtagacg ccaactctct ctagctcgct agtgggttgc aggaggtgct    1020
tacgcatgtt tgtttctttg ctgccgtctt ccagttgctt tatctgttca cttgtgccct    1080
gactttcaac tctgtctcct tcctcttcct acagtactcc cctgccctca caagatgtt    1140 ttgccaactg gccaagacct gccctgtgca gctgtgggtt gattccacac cccgcccgg    1200 cacccgcgtc cgcgccatgg ccatctacaa gcagtcacag cacatgacgg aggttgtgag    1260
gcgctgcccc caccatgagc gctgctcaga tagcgatggt gagcagctgg ggctggagag    1320
acgacagggc tggttgccca gggtccccag gcctctgatt cctcactgat tgctcttagg    1380
tctggcccct cctcagcatc ttatccgagt ggaaggaaat ttgcgtgtgg agtatttgga    1440
tgacagaaac acttttcgac atagtgtggt ggtgccctat gagccgcctg aggtctggtt    1500
tgcaactggg gtctctggga ggaggggtta agggtggttg tcagtggccc tccaggtgag    1560 cagtagggg gctttctcct gctgcttatt tgacctccct ataacccat gagatgtgca    1620 aagtaaatgg gtttaactat tgcacagttg aaaaaactga agcttacaga ggctaagggc    1680
ctcccctgct ggctgggcg cagtggctca tgcctgtaat cccagcactt gggaggcca    1740 aggcaggcgg atcacgaggt tgggagatcg agaccatcct ggctaacggt gaaacccgt    1800 ctctactgaa aaatacaaaa aaaattagc cgggcgtggt gctgggcacc tgtagtccca    1860
gctactcggg aggctgagga aggagaatgg cgtgaacctg gcggtggag cttgcagtga    1920 gctgagatca cgccactgca ctccagcctg gcgacagag cgagattcca tctcaaaaaa    1980
aaaaaaaaaa ggcctcccct gcttgccaca ggtctcccca aggcgcactg gcctcatctt    2040
gggcctgtgt tatctcctag gttggctctg actgtaccac catccactac aactacatgt    2100
gtaacagttc ctgcatgggc ggcatgaacc ggaggcccat cctcaccatc atcacactgg    2160
aagactccag gtcaggagcc acttgccacc ctgcacactg gctgctgtg ccccagcctc    2220 tgcttgcctc tgaccctgg gcccacctct taccgatttc ttccatacta ctacccatcc    2280
acctctcatc acatccccgg cggggaatct ccttactgct cccactcagt tttcttttct    2340
ctggctttgg gacctcttaa cctgtggctt ctcctccacc tacctggagc tggagcttag    2400
```

```
gctccagaaa ggacaagggt ggttgggagt agatggagcc tggtttttta aatgggacag    2460
gtaggacctg atttccttac tgcctcttgc ttctcttttc ctatcctgag tagtggtaat    2520
ctactgggac ggaacagctt tgaggtgcgt gtttgtgcct gtcctgggag agaccggcgc    2580
acagaggaag agaatctccg caagaaaggg gagcctcacc acgagctgcc cccagggagc    2640
actaagcgag gtaagcaagc aggacaagaa gcggtggagg agaccaaggg tgcagttatg    2700
cctcagattc acttttatca cctttccttg cctctttcct agcactgccc aacaacacca    2760
gctcctctcc ccagccaaag aagaaaccac tggatggaga atatttcacc cttcaggtac    2820
taagtcttgg gacctcttat caagtggaaa gtttccagtc taacactcaa aatgccgttt    2880
tcttcttgac tgttttacct gcaattgggg catttgccat caggggggcag tgatgcctca    2940
```